US012792651B2

(12) United States Patent
Sacerdoti et al.

(10) Patent No.: US 12,792,651 B2
(45) Date of Patent: Nov. 10, 2026

(54) SYSTEM AND METHODS FOR A NATURAL-LANGUAGE DATABASE INTERFACE PROVIDING A DETERMINISTIC OUTPUT

(71) Applicant: Quarrio Corporation, Berkeley, CA (US)

(72) Inventors: Earl David Sacerdoti, Alamo, CA (US); Muhammad Qasim, Lahore (PK); Nabia Mansoor Feroze, Rawalpindi (PK); Sarah Mohrle, McKinney, TX (US)

(73) Assignee: Quarrio Corporation, Berkeley, CA (US)

( * ) Notice: Subject to any disclaimer, the term of this patent is extended or adjusted under 35 U.S.C. 154(b) by 0 days.

(21) Appl. No.: 19/380,643

(22) Filed: Nov. 5, 2025

(65) Prior Publication Data

US 2026/0127203 A1 May 7, 2026

Related U.S. Application Data

(60) Provisional application No. 63/717,003, filed on Nov. 6, 2024.

(51) Int. Cl.
*G06F 16/338* (2019.01)
*G06F 16/334* (2025.01)

(52) U.S. Cl.
CPC ........ *G06F 16/3344* (2019.01); *G06F 16/338* (2019.01)

(58) Field of Classification Search
CPC ........................... G06F 16/3344; G06F 16/338
See application file for complete search history.

(56) References Cited

U.S. PATENT DOCUMENTS 10,817,554 B2 * 10/2020 Rezaei .................. G06F 16/338
2016/0179934 A1 * 6/2016 Stubley ................. G06F 16/243 707/722

(Continued)

OTHER PUBLICATIONS

Androutsopoulos I, Ritchie GD, Thanisch P. Natural language interfaces to databases—an introduction. Natural language engineering. Mar. 1995;1(1):29-81.*

(Continued)

*Primary Examiner* — Mohsen Almani

(74) *Attorney, Agent, or Firm* — Dentons US LLP; Derek Auito

(57) ABSTRACT

A system and method are disclosed for interfacing with one or more databases using natural-language queries. The system translates a natural-language input into an intermediate formal representation, such as a Concept Query Language (CQL), which references domain concepts rather than database-specific structures. A data access subsystem maps these domain concepts to database-specific queries using a domain dictionary, enabling seamless translation across heterogeneous databases and database management systems (DBMSs). The system supports distributed data retrieval, error recovery, and dynamic query planning. A presentation subsystem formats the results into user-friendly outputs such as charts or tables. The architecture allows for modular grammar and dictionary configuration, enabling rapid adaptation to new domains, schemas, or user roles without procedural code changes. This approach improves accessibility, maintainability, and scalability of database interactions by abstracting technical complexity from end users.

26 Claims, 14 Drawing Sheets

(56) References Cited

U.S. PATENT DOCUMENTS

| | | | | |
|---|---|---|---|---|
| 2016/0239562 | A1* | 8/2016 | Schilder | G06F 16/3344 |
| 2017/0213157 | A1* | 7/2017 | Bugay | G06F 40/30 |
| 2020/0183960 | A1* | 6/2020 | Sharafi | G06F 16/3325 |
| 2022/0067037 | A1* | 3/2022 | Ranganathan | G10L 15/22 |

OTHER PUBLICATIONS

Küpper D, Storbel M, Roesner D. NAUDA: A cooperative natural language interface to relational databases. InProceedings of the 1993 ACM SIGMOD international conference on Management of data Jun. 1, 1993 (pp. 529-533).*

Lei C, Özcan F, Quamar A, Mittal AR, Sen J, Saha D, Sankaranarayanan K. Ontology-Based Natural Language Query Interfaces for Data Exploration. IEEE Data Eng. Bull . . . Aug. 2018;41(3):52-63.*

Owei V, Navathe SB, Rhee HS. An abbreviated concept-based query language and its exploratory evaluation. Journal of Systems and Software. Jul. 15, 2002;63(1):45-67.*

International Search Report and Written Opinion of International Application No. PCT/US2025/054228 dated Feb. 4, 2026 (18 pages).

* cited by examiner

SYSTEM AND METHODS FOR A NATURAL-LANGUAGE DATABASE INTERFACE PROVIDING A DETERMINISTIC OUTPUT

CROSS-REFERENCE TO RELATED APPLICATIONS

This application claims the benefit of priority under 35 U.S.C. § 119(e) to U.S. Provisional Application No. 63/717,003, filed on Nov. 6, 2024, the entire disclosure of which is hereby incorporated by reference.

FIELD OF THE INVENTION

This Application generally describes techniques relating to an improved database interface.

BACKGROUND

In modern enterprises, information is often siloed across different departments and systems, making it difficult to access and utilize data effectively. Traditional methods of data analysis and information retrieval, such as spreadsheets and Business Intelligence (BI) software, require specialized skills and are often bottlenecks in the decision-making process.

While relatively large amounts of data can be maintained in a computer system having one or more data structures, such as either relational database structures or other structures such as spreadsheets, retrieving useful information from database structures can sometimes be difficult.

A first method is to query a database structure using a database management system, using an applicable query language such as SQL ("structured query language"). While this first method can retrieve information desired by the operator (or other controlling element, as described herein), it has the drawback that to use it, operators (or developers of a database interface) should be familiar: with the database schema, with how to code in SQL or another applicable query language, and with how to interface with the database management system.

A second method is to attempt to translate requests made in a different format (such as natural language requests) directly into SQL or another applicable database query language. While this second method can also retrieve information desired by the operator, it is subject to drawbacks. First, the translation device should be familiar with the structure of the database (including information about the types of each field or other element of the database and how those elements are composed into aggregated structures such as tables, and the logical relationships among the elements, such as might be expressed in the database schema), with the domain concepts that operators might express, with how those domain concepts map to and from the values of database elements, and with how to interface with the database management system. Domain concepts can be affiliated with a specific domain, e.g., a specified sphere of business, activity, or knowledge, such as cellular phones, semiconductor fabrication, or sales of specific products or services. Second, when it is desired to use this second method with a different database schema, or with different domain concepts that operators might express, with different ways those domain concepts map to values of database elements, or with a different database management system (such as one that uses a different query language), it might be necessary or desirable to redesign or reimplement significant portions of the translation algorithm. For example, it might be necessary or desirable to rewrite large portions of the translation device to provide translation of natural language queries into a different database query language or into queries for a database having a different schema.

For one example, the operator might request information from the database for a particular "calendar quarter". In such cases, the translation device should be familiar with how the database maintains information about events and about their times and durations. In one such case, if each event is associated with a field that contains a particular date formatted as a string (such as "Mar. 3, 1953"), the translation device should know how to extract the month from that date string, and should know how to associate selected months with the calendar quarter to which they belong. In another such case, if each event is associated with a field that contains a particular date-time group formatted as a string (such as "19530303021506"), the translation device should know how to compare that timestamp with the earliest and latest times of each quarter, to determine to which calendar quarter that event belongs.

For another example, the operator might request information to be determined in response to the values maintained in one or more database fields. In one such case, the operator might request "contact information" (which the operator might intend to be an aggregation of multiple fields: phone number, email address, or otherwise). In another such case, the operator might request objects "within 50 miles" of a selected object (which might require determining the position of the selected object, determining the position of other objects, and calculation of distances between objects, each possibly in response to the values maintained in or derived from one or more database fields).

Each of these issues, as well as other possible considerations, might cause difficulty in aspects of systems and methods for interfacing with databases via natural language or other formats expressed in terms additional to what is defined in a database schema, in efficient and effective development of such systems and methods, and in maintenance of such systems and methods.

This Application describes technologies that can be used with inventions, and other technologies, described in one or more of the documents below. Each of these documents are incorporated by reference in their entirety.

An article, naming author Gary G. Hendrix, titled "LIFER: A Natural Language Interface Facility," Technical Note 135. AI Center, SRI International, 333 Ravenswood Ave, Menlo Park, CA 94025, December 1976.

An article, naming author Gary G. Hendrix, titled "Lifer Manual: A Guide To Building Practical Natural Language Interface," Technical Note 138. AI Center, SRI International, 333 Ravenswood Ave., Menlo Park, CA 94025, February 1977.

An article, naming author Gary G. Hendrix, titled "Human Engineering For Applied Natural Language Processing," Technical Note 139. AI Center, SRI International, 333 Ravenswood Ave., Menlo Park, CA 94025, March 1977.

An article, naming author Earl D. Sacerdoti, titled "Language Access To Distributed Data With Error Recovery," Technical Note 140. AI Center, SRI International, 333 Ravenswood Ave., Menlo Park, CA 94025, February 1977.

An article, naming author Daniel Sagalowicz, titled "IDA: An Intelligent Data Access Program," Technical Note 145. AI Center, SRI International, 333 Ravenswood Ave., Menlo Park, CA 94025, June 1977.

An article, naming authors Gary G. Hendrix, Earl D. Sacerdoti, Daniel Sagalowicz, and Jonathan Slocum, titled "Developing A Natural Language Interface To Complex Data," Technical Note 152. AI Center, SRI International, 333 Ravenswood Ave., Menlo Park, CA 94025, August 1977.
An article, naming authors Earl D. Sacerdoti and Daniel Sagalowicz, titled "A Ladder User's Guide (Revised)," Technical Note 163. AI Center, SRI International, 333 Ravenswood Ave., Menlo Park, CA 94025, March 1980.
An article, naming author Robert C. Moore, titled "Handling Complex Queries In A Distributed Data Base," Technical Note 170. AI Center, SRI International, 333 Ravenswood Ave., Menlo Park, CA 94025, October 1979.
U.S. Pat. No. 6,222,540, issued Apr. 24, 2001, naming inventor Earl Sacerdoti, titled "User-friendly graphics generator including automatic correlation", assigned to assignee Portola Dimensional Systems, Inc.
Earley, Jay (1970), "An efficient context-free parsing algorithm," *Communications of the ACM,* 13 (2): 94-102.
US 2010/0114927 (Becker) (now U.S. Pat. No. 8,140,504 B2).
US 2002/0023091 A1, published Feb. 21, 2002, "Architecture for Distributed Database Information Access."
David Silberberg and John Schneider, "A Mediated Architecture for Content-Based Search of Distributed Multimedia Scientific Data Archive," John Hopkins Applied Physics Laboratory, May, 1998.
B. Sujatha and S. Viswanadha Raju, "Ontology Based Natural Language Interface for Relational Databases," Procedia Computer Science 92 (2016) 487-492.
Phillip Cohen et al., U.S. Pat. No. 12,118,321 B2, and the family it derives from
Diego Magro and Anna Goy. Towards a first Ontology for Customer Relationship Management, CSTST '08 Proceedings of the 5th International Conference on Soft Computing as Transdisciplinary Science and Technology, Pages 637-643, Cergy-Pontoise, France.
David L. Waltz, "An English Language Question Answering System for a Large Relational Database", Communications of the ACM, Volume 21, July 1978.
Warren D and Pereira, F, "An efficient and easily adaptable system for interpreting natural language queries in Computational Linguistics." Volume 8 pages 3-4, 1982.
I. Kameny, J. Weiner, M. Crilley, J. Burger, R. Gates and David Brill, "EUFID: The End User Friendly Interface to Data Management Systems", Proceeding VLDB '78 Proceedings of the fourth international conference on Very Large Data Bases—Volume 4 Pages 380-391, 1978.
Carole D. Hafner, "Interaction of Knowledge Sources in a Portable Natural Language Interface", Proceeding COLING '84 Proceedings of the 10th international conference on Computational linguistics Pages 57-60, 1984.
Barbara J. Grosz., "TEAM: A Transportable Natural Language Interface System", Proceedings of the Conference on Applied Natural Language Processing held at Santa Monica, California, ed. Association for Computational Linguistics, 39-45. Morristown, N.J.: Association for Computational Linguistics, 1983.
Ralph Weischedel, "A hybrid approach to representation in the Janus natural language processor", ACL '89 Proceedings of the 27th annual meeting on Association for Computational Linguistics pp. 193-202, 1989.
Ana-maria Popescu, Alex Armanasu, Oren Etzioni, David Ko and Alexander Yates, "Modern Natural Language Interfaces to Databases: Composing Statistical Parsing with Semantic Tractability", COLING '04 Proceedings of the 20th international Conference on Computational Linguistics, Article No. 141, 2004.
Yunyao Li, Huahai Yang, and H. V. Jagadish, "NaLIX: an Interactive Natural Language Interface for Querying XML", ACM SIGMOD'05 International Conference on Management of Data, pp. 900-902, 2005.
YukWah Wong and Raymond J. Mooney, "Learning for Semantic Parsing with Statistical Machine Translation", In Proceedings of the Human Language Technology Conference of the North American Chapter of the Association for Computational Linguistics (HLT/NAACL-2006). pp. 439-446, New York City, NY, June 2006.
Michael J. Minock, "A STEP Towards Realizing Codd's Vision of Rendezvous with the Casual User", VLDB '07 Proceedings of the 33rd International Conference on Very Large Data Bases, 2007.
Faraj A. El-Mouadib, Zakaria Suliman Zubi, A. Almagrous and I. El-Feghi, "Generic Interactive Natural Language Interface to Databases (GINLIDB)", Proceedings of the 10th WSEAS International Conference on Evolutionary Computing, 2009.
Michael Minock, "C-Phrase: A System for Building Robust Natural Language Interfaces to Databases", Journal Data & Knowledge Engineering, Volume 69 Issue 3, pp. 290-302, 2010.
Pazos R., R. A., González B., J. J., Aguirre L., M. A. (2011). Semantic Model for Improving the Performance of Natural Language Interfaces to Databases. In: Batyrshin, I., Sidorov, G. (eds) Advances in Artificial Intelligence. MICAI 2011. Lecture Notes in Computer Scienceo, vol 7094. Springer, Berlin, Heidelberg.
Veera Boonjing* and Cheng Hs, "Natural Language Interaction Using a Scalable Reference Dictionary", 8th International Conference on Applications of Natural Language to Information Systems, June 2003, Burg (Spreewald), Germany, pp. 42-55
Stratica, Niculae & Kosseim, Leila & Desai, Bipin. (2003). "NLIDB Templates for Semantic Parsing", 8th International Conference on Applications of Natural Language to Information Systems, June 2003, Burg (Spreewald), Germany, pp. 235-241.

SUMMARY

This disclosure is intended as only a general description and should not be interpreted as a limitation of the invention in any way. Moreover, this disclosure should be read and understood as it would be by one of ordinary skill in the art in the light of the entire disclosure.

This disclosure describes techniques, including systems and methods, for natural-language interfaces to databases. At a very high level, they are comprised of three major portions: natural language processing, planning and execution of database actions, and operator-viewable presentations of results.

The present invention addresses the above challenges by providing a system and method that integrates natural language processing, sequence planning and re-planning for retrieval of data distributed among multiple databases accessed through multiple Database Management Systems ("DBMSs"), data extraction, execution monitoring, error recovery, and visualization to enable seamless access to information and automate business processes.

The natural language processing subsystem transforms an input request expressed in natural language into a formal language that references domain concepts or sub-concepts without reference to the structure of the database. Concepts represent real-world domain entities and are defined for each domain. One embodiment of such a formal language is Concept Query Language ("CQL"). The natural language processing subsystem requires two types of knowledge sources: 1) a grammar describing sentence patterns for a natural language 2) a domain dictionary or ontology describing concepts and their relationships. It uses these knowledge sources to: 1) parse an input request and generate one or more parse trees, and 2) utilize the parse trees and information in the domain dictionary to generate a CQL query. In addition, it constructs a natural-language paraphrase from the formal language representation. This paraphrase indicates the system's understanding of the operator's input request, providing assurance to the operator that the request was correctly interpreted. This disclosure describes examples of structure-independent queries or CQL queries; other alternatives are possible. The provided examples do not limit the scope of the claims to the particular described embodiments.

In a natural-language request system, use of techniques as further described herein can separate the process of parsing the input from the process of mapping the parsed input to specific database management commands. They can obviate the need for the grammar writers and maintainers to know how the information in the database is formatted into specific fields, portions of fields, and aggregations of fields. They can also permit the grammar to remain unchanged when the structure of the database it addresses changes. And when the database is augmented with additional fields, or aggregations thereof, they can simplify extending the grammar employed by the natural-language parser to cover additional domain concepts that might be referenced by such additional fields or aggregations.

The CQL query may then be passed to a database interface.

In one example, a database interface (for one embodiment, sometimes referred to herein as a "data access subsystem") can use knowledge, such as knowledge about mapping between domain concepts and database structures, which can be embodied in a domain dictionary. This knowledge can assist in translating between one or more domain-specific requests expressed in terms of domain concepts (such as requests expressed in a natural language) and one or more requests expressed in terms of a database structure. For example, the requests expressed in terms of a database structure can refer, without limitation, to one or more of: tables, their constituent fields, or their associated formats) accessible by a relational or similar database management system.

In another example, the database interface can enable processing of database queries about information that is distributed among a plurality of databases (or database commands/queries whose effect is distributed among a plurality of databases), in which some of those databases might differ in the manner by which they maintain information associated with those queries or commands. In such cases, multiple databases can maintain data in different sets of tables, in tables having different sets of constituent fields, or in fields having different field formats. When queries or commands involve processing with respect to such multiple databases, the database interface can use knowledge, such as knowledge about mapping between domain concepts and database structures, which can be embodied in a domain dictionary, as well as knowledge about how to perform conventional database operations. This knowledge can assist in translating between queries or requests expressed in terms of the concepts of the domain, and queries or requests expressed in terms of the differing structure of the multiple databases.

In another example, the one or more databases can be accessible by a plurality of different database management systems, which might differ in the format in which they accept queries or requests directed at those one or more databases, or in the manner by which they support techniques for directing queries or requests to those databases. In such cases, multiple database management systems can process substantially equivalent queries or requests in different languages or syntaxes. For example, a single query or request to the database interface might result in multiple SQL statements, each expressed in alternative SQL dialects, that might be issued to different databases (such as to a SalesForce™ CRM database and to an Oracle™ financial database).

Combinations of these examples, in whole or in part, are also possible.

The database interface may then pass the data set resulting from its processing to a presentation subsystem. The presentation subsystem can comprise a collection of presentation rules that express presentation conventions, for example that time-valued data be distributed along the x-axis of a graph. Responsive to presentation requirements expressed in the operator's queries, such as the type of output (e.g., value, table, chart) and the order of presentation (e.g., the order of columns within a table), together with rules in the rule set, the presentation subsystem can compose an appropriate presentation of the domain concepts and their values to an operator or user of the system.

One of skill in the art will recognize that the system and method disclosed herein is, advantageously, configured almost exclusively by modifying human-readable data structures. Consequently, adapting the system and method to a new database, a new database management system, a new knowledge domain, or a new collection of operators of the system and method may be carried out by individuals having lower skill levels and less experience with approaches to natural-language database interfaces than the prior art. Virtually no procedural coding is needed to perform such adaptations.

Concept-Based Requests

In one embodiment, an interface, such as a natural language interface, can receive an information request from an operator. The interface can translate the information request into a concept-based request expressed in a formal language such as CQL, the concept-based language request referring to domain concepts that are not necessarily directly represented within the database. For example, the concept-based request can reference domain concepts that are not explicitly stored in the database, which can be derived from (or otherwise applied to) fields stored in the database with some manipulation.

Domain concepts can be more general and more abstract than the structures specified in a database schema (such as tables and fields). Advantages can accrue from expressing natural-language query and presenting resulting datasets in terms of domain concepts: (1) A system can be developed more efficiently because it simply needs to request, retrieve, or update domain concepts rather than perform computations using database fields directly. (2) A system can be updated and maintained more efficiently, because the data access subsystem "hides" the complexity of the database structure from developers. (3) Systems can interact with human operators employing domain concepts, with which operators can be expected to be familiar, rather than database fields and structures, of which operators might have no substantial knowledge. (4) A collection of domain concepts employed by a system can define a range of information the system can manipulate, with the effect that a documented domain dictionary can provide guidance to developers or maintainers of a system as to what kinds of information can be represented by the database. (5) A single information request can reference domain concepts reflecting data in multiple databases, but the use of domain concepts can "hide" this complexity from developers or maintainers of a system.

A data access subsystem can translate the concept-based language request into one or more database-dependent requests to a database management system ("DBMS"), such as one or more SQL statements, which reference the structure and actual elements (such as fields) of the database schema. The database-dependent requests can be readily applied to the database without substantial modification. Alternatively, the data access subsystem can translate the concept-based language request into one or more database-dependent requests and one or more DBMS interface messages associated therewith, such as an SQL query specialized to the dialect of SQL supported by a particular DBMS, which references the actual fields of the database schema in the format required by the DBMS. Additionally, the data access subsystem can translate the concept-based language request into one or more database-dependent requests and one or more DBMS interface messages associated therewith, wherein the database-dependent requests address may address different databases and different database management systems.

For example, the operator can ask for information about "quarterly sales" without having to know whether the database represents the time of sales events by an explicit reference to a month, a portion of a string that includes a substring referencing a month, or instead with a timestamp. The natural language interface can translate the information request into a concept-based language request that references calendar quarters. The data access subsystem can translate the concept-based language request into a database-dependent request to the relevant DBMS that references the specific one or more restrictions on specific one or more fields that limit retrieved records to those falling within the specified calendar quarter.

The data access subsystem can receive a result (such as a dataset) provided by the DBMS in response to the database-dependent request, and any DBMS interface messages associated therewith, which can be organized into a presentation (such as a chart or table) to be provided to the operator or to another entity specified in an information query (for example, a specified printer).

The data access subsystem can include (or be disposed to access) a domain dictionary, having data structures that describe how to map between domain concepts (such as, in the example above, "calendar quarter") and one or more database fields or portions thereof. For example, the domain dictionary can include a mapping between a selected domain concept and one or more of:

- A method of retrieving data elements from the database associated with that domain concept, e.g., retrieving the quarter in which a particular sale occurred;
- A method of restricting data elements retrieved from the database to one or more particular values for that domain concept, e.g., retrieving the sales made in the most recent quarter;
- A method of presenting data elements retrieved from the database that are associated with one or more particular values for that domain concept, e.g., presenting sales volume on a quarterly basis; and
- A method of inserting data elements into the database associated with one or more particular values for that domain concept, e.g., entering sales volume for a selected quarter for a known salesperson.

After reading this Application, those skilled in the art would recognize that one or more of these mappings in the domain dictionary are optional. Moreover, after reading this Application, those skilled in the art would recognize that the domain dictionary can optionally include other and further mappings between domain concepts and techniques associated with retrieving information from or otherwise manipulating a database.

More than One Database or DBMS

In another embodiment, the interface can enable processing of an information request with respect to information distributed among a set of heterogeneous databases, such as when some of those databases differ in the way they maintain information or in the way that information is accessible by a DBMS.

For example, the operator can ask for information about "quarterly sales" without having to know that the request entails retrieving time-valued data from two distinct databases, where one of the databases represents the time of sales events on a monthly basis, while another represents the time of sales events with a timestamp. Similarly, the operator does not have to know that one DBMS uses an SQL dialect while another DBMS uses a MUMPS dialect. The CQL request can reference the domain concept "calendar quarter" without necessarily specifying the way any particular database represents that domain concept or the way of accessing any particular database.

The data access subsystem can, using the domain dictionary, and for each particular database, translate the CQL request into a sequence of one or more database-dependent and/or DBMS-dependent requests (such as presented to the DBMS managing that database), which reference the particular fields and formats used by that database. The order of the sequence of the requests can be important in formulating a response because, for example, the results may be used to formulate or modify additional database requests.

In one such case, information can be distributed across more than one such database, each maintaining the information in its own way (each one in response to management by a single DBMS). The data access subsystem can, using the domain dictionary, access the information for each particular database employing queries and commands specific to the DBMS that manages the databases, optionally insert restrictions derived from the values of previously-retrieved fields extracted from previously-accessed ones of those databases into database queries, collect the responses provided by the DBMS managing the databases to compose values of domain concepts, and integrate those values into a unified dataset for presentation to the operator or to another entity specified in an information query.

In another such case, information can be accessed by more than one such DBMS, each responding to different interface messages. The data access subsystem can, using the domain dictionary, access the information for each particular database employing queries and commands specific to the DBMS that manages that particular database, optionally insert restrictions derived from the values of previously-retrieved fields extracted from previously-accessed databases into database queries, collect the responses provided by the more than one DBMS into a unified dataset to compose values of domain concepts, integrate those values, and manipulate that dataset into a presentation or specify aspects of the desired presentation to a separate presentation subsystem.

After reading this Application, those skilled in the art would recognize that combinations and extensions of these described techniques would be workable, and are within the scope and spirit of the invention.

BRIEF DESCRIPTION OF THE FIGURES

In the figures, like references generally indicate similar elements, although this is not strictly required. With respect to apparatus and systems, the figures are not necessarily drawn to scale for construction, nor do they necessarily specify any particular location or order of construction. With respect to methods and procedures, the figures do not necessarily specify strict order of operation, nor do they necessarily specify that any particular steps must be performed by particular devices.

DETAILED DESCRIPTION

Figure 1:
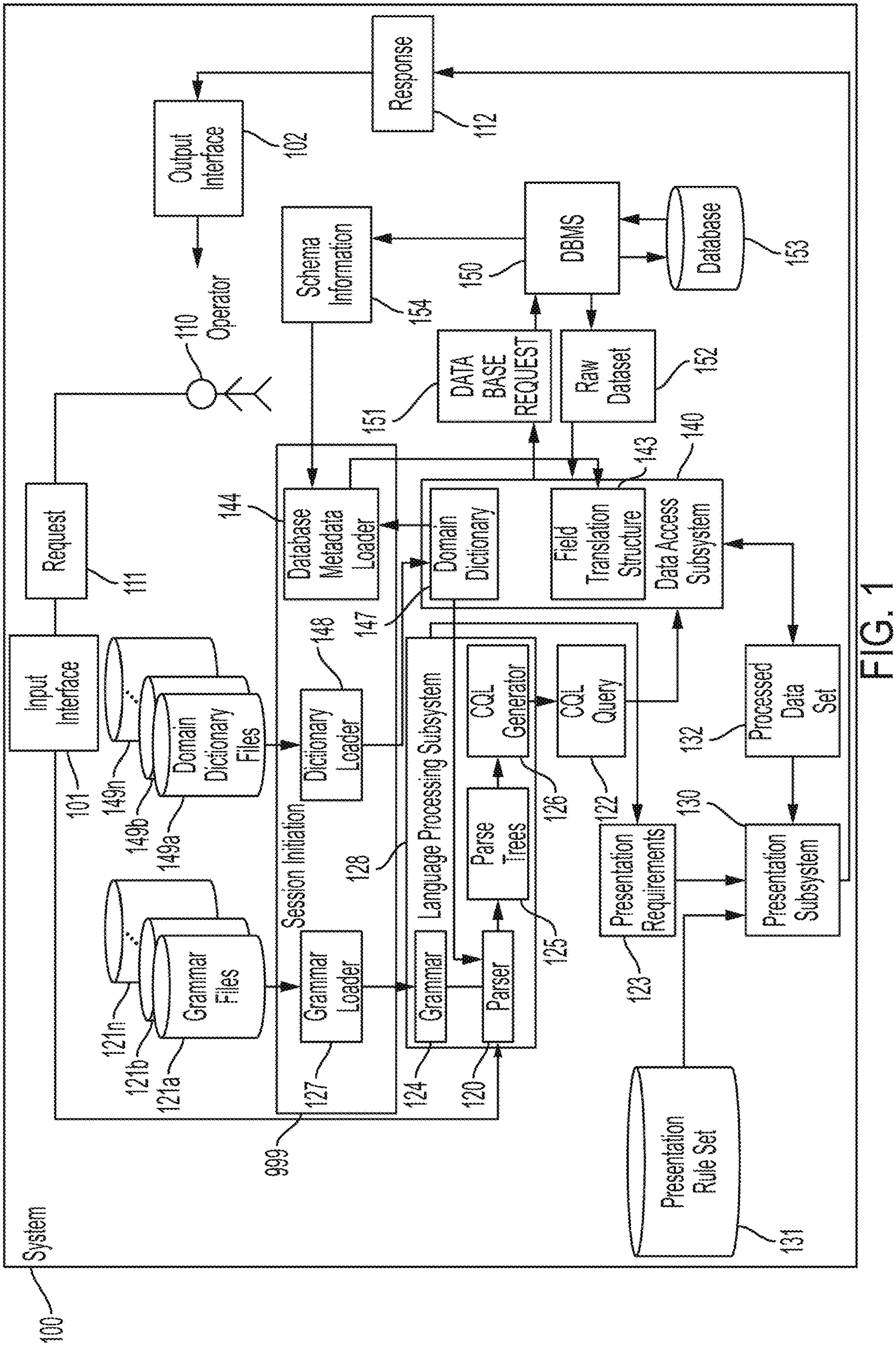
FIG. 1 shows a conceptual drawing of an example system including access to a database according to an example embodiment.

This Application describes techniques applicable to relational database management systems and to database queries (such as SQL queries) applicable to databases managed by those database management systems. However, in the context of the invention, there is no particular requirement for any such limitation. For example, techniques described herein can be used with respect to other types of databases, to other database query techniques, to other types of database management systems, to other types of data storage structures such as spreadsheets, and with respect to data distributed among multiple types of database management systems.

Terms and Phrases

The term "operator", the terms and phrases "controller" or "controlling element" (and similar phrases and terms) generally refers to any one or more persons, techniques, machines, methods, or otherwise, providing electrical or audio/visual inputs or receiving outputs to a database management system, a database, or an interface thereto. For example, while the embodiments described herein are primarily described with respect to an operator including one or more persons, in the context of the invention, there is no particular requirement for any such limitation. If not actually a natural person, the operator can include a physical controller providing electrical or audio/visual inputs or receiving outputs, a software controller providing inputs or receiving outputs, a machine learning or artificial intelligence device providing inputs or receiving outputs, or otherwise.

The phrase "database management system", the term "DBMS", and similar phrases and terms, generally refer to any computerized method or system for recording, maintaining, organizing, inserting, modifying, or retrieving information; where that information is disposed in a structured or semi-structured manner; and where that information is disposed for manipulation by any computerized method or system. For example, a database management system can refer to a method or system for management of any one or more databases as described herein, or other computerized techniques capable of performing (or being used to perform) one or more manipulations similar to those described herein.

The term "database" (and similar terms) generally refers to a collection of data or information, organized in a manner accessible by a computerized method or system, such as managed by one or more database management systems (such as any structured data collection). For example, a database can refer to a relational database structure, a No-SQL database structure, an XML data structure, a JSON text object, a Lisp object, a spreadsheet, a set of metadata for an unstructured data collection, or another data structure capable of being used in performance of one or more operations similar to those described herein. One purpose of a database is to store data about concrete or abstract entities. The database can thus serve as a model of the entities about which its data refers. For example, locating and tagging pictures of a person in a video document by retrieving, creating, or modifying metadata of that video document, or in response to a name or picture of that person, is within the scope and spirit of a request to a database management system to retrieve or otherwise manipulate information from a database.

The phrase "database structure" (and similar terms) generally refers to one or more data structures, storage, or data representation techniques, by which a database can maintain data. For example, distinct databases can maintain data in different sets of tables, can maintain data in tables having different sets of constituent fields, or can maintain data in fields having different field formats. For another example, distinct field formats can include different data types having substantially equivalent or substantially similar meanings, such as using binary-typed values to represent numbers, text-typed values to represent those numbers, text-typed values to represent words having the meaning associated with those numbers, or otherwise. For another example, distinct databases can maintain similar data in differing types of database organization, such as for example, a relational database, a network database, a hierarchical database, a noSQL database, or otherwise.

The phrase "database schema" or the term "schema" (and similar phrases and terms) generally refer to a description or model of the database structure, describing some or all of the fields of the database, their formats, and the relationships between them, procedures to be executed by the database management system associated with retrieving, storing, modifying, or deleting particular fields or collections of fields of the database, rules describing integrity or consistency constraints that the database management system enforces, or otherwise. For example, some types of database management systems, such as relational database management systems, have an explicit data structure, separate from the data itself, that contains the schema. For another example, some other types of databases, such as certain databases implemented in XML or JSON, may have a schema embedded with the data. As used herein, the phrase "database schema" and the term "schema" can relate to non-relational databases as well as to relational databases.

In the context of database management systems, the terms "command" or "request" (and similar terms or phrases) generally refer to one or more instructions to a database management system, such as ones expressed in SQL or another database management system language. Commands or requests generally instruct the database management system to respond with or return information from a database, or to alter/modify or add information to a database, to reorganize the database (such as to create/delete tables or fields). or a combination of such instructions. Commands or requests are sometimes referred to herein as "queries". When referred to as a "query", commands or requests generally instruct the database management system to respond with or return information.

In the context of a database coupleable to a DBMS, the terms "manage" and "management" (and similar terms or phrases) generally refer to actions by the DBMS to act upon information maintained in the database. For example, the DBMS can retrieve information maintained by the database, alter information maintained in the database, delete information from the database, add information to that maintained in the database, or otherwise. A DBMS is sometimes described herein as "operating on", or performing one or more "operations on", a database to perform management thereof.

The phrase "natural language" (and similar phrases) generally refers to any language from which human-understandable meanings are found, or which is spoken or written by human speakers, or which is used for exchanging natural meanings between human beings. For example, languages with human speakers or writers, such as English, Mandarin, Navaho, and Spanish, are examples of natural languages. The phrase "natural language" can also refer to a subset thereof, such as a subset of English that can be recognized, parsed, or specified, using a set of rules in a computer system. The subset of the natural language can include a subset suitable for interacting with a software product (such as a database or a DBMS program) while being comfortable and workable for use by business executives, office workers, military officials, and other whose areas of expertise are outside the fields of computer science. One such subset includes the INLAND language definition, as described in the Incorporated Disclosures at Technical Note 138. "Natural language" also includes language phrases that are not strictly grammatical, including elliptical phrases, misspelled or mispronounced words, paraphrases and abbreviations, anaphora or cataphora, or redefinitions.

In the context of natural-language processing or user interface, phrases "natural-language query," "natural-language input," "prompt" (and similar phrases) generally refer to any word sequence. Note that different embodiments may receive the natural-language query from a user entry in a user interface or via an API that received a natural-language query using a different methodology, such as another user interface or a machine-generated query.

The phrases "query in the Concept Query Language ("CQL")", "CQL query" (and similar phrases) generally refers to any query or command that is independent of the structure of a database or databases to which it is being applied. Thus, a CQL query can include one or more of: requests to a DBMS to provide information from the database, to alter information maintained by the database, to delete information maintained by the database, or to add new information to be maintained by the database. For example, a CQL query regarding information stored or derivable from data stored in a relational database would specify or assume no information about the names or formats of fields in the database, or how those fields were organized into relations or tables. It does not imply that the query itself has no structure. An exemplary CQL structure is disclosed below, however, there is no particular requirement to employ that particular syntax. A CQL query can include a request to retrieve information from the database(s), a request to alter information in the database(s), a request to delete information from the database(s), or a request to insert information into the database(s), or more than one such action, or otherwise. Further such a query may refer to information distributed across data managed by multiple instances of a DBMS, or by multiple DBMSs.

The phrase "domain concept" (and similar phrases) generally refers to any concrete or abstract entity to which elements within a database refer, or which can be computed from elements within a database. Domain concepts can include what the database models, such as the real-world concepts modeled by portions or all of one or more fields within the database structure. More than one database structure can be used to model the same, or substantially similar, domain concepts. For example, as further described herein, the domain concept of when a president was elected can be extracted from the operator's natural language request "when . . . elected", expressed in a query in CQL as a LastElectionYear concept. This concept can be translated into a database retrieval request and/or retrieval restriction in response to performing some computation using the field TERM-START-DATE in one possible database structure. In an alternative database structure, the same concept can be translated into a database retrieval request and/or retrieval restriction in response to performing some computation using the field ELECTION-YEAR. For another example, the domain concept of a person's contact information can be determined in response to the operator's natural language request "how do I find . . . ", expressed in a query in CQL as a contact_information concept, and can be derived or computed from an exemplary database using data from the fields PHONE-NUMBER, EMAIL-ADDRESS, and POSTAL-ADDRESS.

The phrase "domain dictionary" (and similar phrases) generally refers to any computerized data structure that can be used for mapping between the values of domain concepts and the values of data stored in one or more target databases (whose logical structure is defined by a database schema or equivalent information). For example, a domain dictionary can include a table in which each row corresponds to a domain concept and in which columns comprise methods for accessing values of that domain concept, restricting queries in response to specified values of that domain concept, presenting datasets including that domain concept and values for it, or inserting or modifying entries in the database with respect to that domain concept. However, the domain dictionary need not be stored as a distinct table; the information relating to domain concepts can be distributed within other data structures accessible by the data access subsystem, such as an ontology representing both the defined concepts as well as additional information such as the relationships among those concepts.

The phrase "related concepts" or "sub-concepts" with respect to a particular concept refers to a collection of concepts which are related to that particular concept. Such relationships may be of multiple types as known in the art, and are indicated within the concept definitions stored in a domain dictionary. For example, a US_state concept might be related to a United_States concept in a hierarchical relationship, and this relationship type could be employed to answer a query about the population of the United States from a database of US state data by summing the values of each state's population. For another example, a duration concept might be related to another concept representing a particular span of time such as "month", "hour", or "quarter". Such non-hierarchical relationships may be represented in the domain dictionary by identifying that a concept can take another concept as a parameter, for example, duration (quarter).

Figures and Text

System and Example Query

FIG. 1 shows a conceptual drawing of an example system including access to a database. A system 100 can include an input interface 101 and an output interface 102, both accessible by an operator 110 (who is not part of the system). For example, the input interface 101 can include input elements such as a keyboard, a pointing device, or a voice input element, as well as software elements (not shown) for use with those devices, or hardware elements coupled to other devices. For another example, the output interface 102 can include output elements such as a visual display, a speaker, or a haptic output element such as a buzzer (as well as software elements for use with those devices). In the embodiments described herein, the input interface 101 and the output interface 102 can generally include hardware elements, even though in some places the software elements to be used therewith might be explicitly discussed.

The operator 110 can present requests 111 in a natural language or other front-end format to the input interface 101, and can receive responses 112 at the output interface 102. While some embodiments described herein are primarily described with respect to the operator 110 including one or more persons, there is no particular requirement for any such limitation. For example, the operator 110 can include a physical controller providing electrical or audio/visual inputs or receiving outputs, a software controller providing inputs or receiving outputs, a machine learning or artificial intelligence device providing inputs or receiving outputs, or otherwise.

Session Initiation

Prior to accepting requests 111 from a particular operator 110, the system initiates an operator-specific session. The session initiation 999 entails identifying particular grammar files 121*a-n* and domain dictionary files 149*a-n* associated with a particular operator 110 or group of operators, for example a department within an organization, and loading them for use by various subsystems. It also entails identifying the particular database(s) 153 and particular database management systems 150 that the operator will interact with and the credentials, authorizations and permissions that the database management systems 150 may have provided with respect to the data within those databases. This is done because individual operators or classes of operators may have differing roles within an organization, and consequently have differing credentials, authorizations and permissions for accessing or modifying particular databases, and operating restrictions within their organization. These factors may enable or forbid the ability of a particular operator 110 to access or modify values of particular concepts. Differing operators 110 may also have differing terms in which they refer to specific concepts.

Initiation consists of a grammar loader 127, a dictionary loader 148, and a database metadata loader 144.

Grammar Loader

Grammar files 121*a-n* may comprise files which may be loaded into memory by grammar loader 127 and transformed into a grammar 124 for the parser 120 to use in parsing. The grammar 124 is preferably stored in random-access memory for efficiency. In preferred embodiments, the grammar files 121*a-n* may be encoded in a human-readable format. Each grammar file may comprise a portion of a complete grammar. Grammar loader 127 may compose a grammar 124 by merging information from particular grammar files or sub-grammar files for each operator or group of operators as discussed below. In some embodiments, a copy of the loaded grammar 124 may be stored in persistent storage and reloaded for later use by the system.

This capability enables the specification of a grammar to be distributed among files corresponding to different levels of specificity. Some grammar files may contain portions of the grammar which are generally applicable to interfacing with databases in general, while other grammar files may contain portions of the grammar which are increasingly specialized to particular kinds of concepts, data, operational tasks, and domains of discourse. This capability may support, for example, organizing grammar files which contain portions of a grammar addressing general queries, portions specialized to particular activities such as sales, portions further specialized to a particular business whose operators interface with the system, and portions further specialized for a particular department within a business.

The grammar 124 may thus advantageously defined, coded, and built from grammar files 121*a-n* and stored in a ready-to-execute format in a manner similar to how operating computer programs are defined, coded, built, and compiled and stored from files containing subprograms written in modern procedural programming languages such as Java or Python.

An exemplary grammar might be loaded from files including common sentence patterns, common phrase patterns (such as for formats of dates), common references to values of specific concepts (like city, state and country names), domain-specific sentence patterns, and organization-specific sentence patterns. It might, for example, be loaded from the following files:

1. Base Grammar—Basic natural-language sentence and phrase structures that can be parsed by the parser and common terms/phrases used across all customers and domains.
2. Domain-Specific Grammar—sentence patterns that are unique to a domain. These will generally reference concepts that are common for that domain. For example, for the sales domain, domain concepts like “account”, “lead”, “opportunity” are common.
3. Organization-Specific Grammar—sentence patterns that are unique to a specific organization, such as jargon or references to concepts specific to the organization.
4. Database Values Grammar—values for concepts that can be queried or referenced in an input which are derived from values of fields in a database. This grammar may be developed from values extracted or computed from values of specific database fields with which the system is disposed to interface.

Dictionary Loader

Domain dictionary files 149*a-n* may comprise files which may be loaded into memory by dictionary loader 148 and transformed into a domain dictionary 147 for the data access subsystem 140 to use creating a sequence of one or more database queries. Each dictionary file may comprise one or more domain concept definitions. The domain dictionary 147 is preferably stored in random-access memory for efficiency. In preferred embodiments, the domain dictionary files 149*a-n* may be encoded in a human-readable format. Each domain dictionary file may comprise a portion of a complete domain dictionary. A dictionary loader 148 may compose a domain dictionary by merging information from particular domain dictionary files for each operator or group of operators as discussed below. In some embodiments, a copy of the loaded domain dictionary may be stored in persistent storage and reloaded for later use by the system.

This capability enables the specification of a domain dictionary to be distributed among files corresponding to different levels of specificity. Some domain dictionary files may contain portions of the domain dictionary which are generally applicable to interfacing with databases in general, while other domain dictionary files may contain portions of the domain dictionary which are increasingly specialized to particular kinds of concepts, data, operational tasks, and domains of discourse. This capability may support, for example, organizing domain dictionary files which address general queries concerning information stored in data stores, ones specialized to a particular domain of activity such as sales, ones further specialized to a particular business whose operators interface with the system, and ones further specialized for a particular department within a business.

The domain dictionary 147 may thus advantageously defined, coded, and built from domain dictionary files 149*a-n* and stored in a ready-to-execute format in a manner similar to how operating computer programs are defined, coded, built, and compiled and stored from files containing subprograms written in modern procedural programming languages such as Java or Python.

An exemplary dictionary might be loaded from files including,

1. Domain-specific dictionaries—Specifications of concepts common to a particular domain or aspect of a domain. For example, for the sales domain, domain concepts like "account", "lead", "opportunity" are common.
2. Organization-specific dictionaries—Specifications of concepts that are unique to a specific collection of operators, such as jargon or references to concepts specific to an organization.

Database Metadata Loader

In one embodiment, the data access subsystem 140 can utilize schema information 154 extracted from the DBMS 150 concerning the database schema associated with the database 153. For example, the schema information 154 can include names of associated data files or data tables; and the names, data types, formats and print names of associated constituent fields. A Database Metadata Loader 144 can extract schema information 154 responsive to the domain dictionary 147 to create a Field Translation structure 143 that maps one or more domain concepts 142*a* to their corresponding database schema metadata. This allows abstraction of physical data structure details and promotes maintainability and flexibility in query generation. However, in the context of this embodiment, there is no particular requirement to employ that particular structure or any such structure. For example, the invention can operate by retrieving the relevant metadata from the database management system each time it is required.

In alternative embodiments, the data access subsystem 140 can utilize schema information 154 from the more than one DBMSs 150, or more than one database 153, concerning one or more database schemas associated with the one or more DBMSs 150 or the one or more databases 153.

Language Processing Subsystem

The system 100 can also include a natural language processing subsystem 128 comprising a parser 120 coupled to the input interface 101, a grammar 124 and a CQL generator 126. In one embodiment, the grammar loader 127 may process a collection of grammar files to compose a grammar 124, as further described herein. In one embodiment, the parser 120 can use the grammar 124 to interpret the request 111 and to generate one or more parse trees 125. Then a CQL generator 126 can interpret the parse trees and construct a CQL query 122. In alternative embodiments, other means of processing natural language input might be used to interpret the request 111 and translate it into the CQL query 122. For example, machine learning techniques, "word vector" and related techniques, and other techniques, can be used to interpret the request 111 and to translate it into a CQL query 122. The language processing subsystem 128 can also provide a set of presentation requirements 123 to a presentation subsystem 130, as further described herein.

The Language Processing Subsystem 128 converts a natural language input into a Concept Query Language (CQL) representation. It may be composed of three subprocesses. 1) A data value processor derives all values for selected concepts that are stored in the database and creates an index of the concepts that each value may be an instance of. 2) A parser 120 receives a natural language input and generates a set of parse trees 125. 3) A CQL Generator 126 processes the parse trees 125 and generates a CQL query 122.

Grammar Syntax

Each grammar may be defined as a set of production rules, or by other representations of a grammar known in the art. The following is an example of a syntax for production rules that comprise an exemplary grammar definition 124:

- Terminal symbols: basic symbols from which sentences are built, such as words (a, an, the, list, show, etc.), numbers, and punctuation marks.
- Non-terminal symbols: These are variables or placeholders that represent patterns of terminal symbols. These are used to define the sentence patterns. Non-terminal symbols may be indicated by enclosing their name within angle brackets, for example, <be-verb>.
- Production rules: These rules define how non-terminal symbols can be replaced by other symbols (terminal or non-terminal). Each rule has three parts:
  - Left Hand Side: a single non-terminal symbol.
  - Right Hand Side: A sequence of terminal and non-terminal symbols.
  - Logical Output: a component to be added to a CQL query, if this rule is used in a successful parse of an operator's input. The Logical Output may be empty if a rule itself does not have any effect on the output.
- The left- and right-hand sides of production rules may be separated by a particular symbol, for example, "→". The right-hand side and logical output may be separated by a different particular symbol, for example, "|".
- Start symbol: A special non-terminal symbol that represents the "root" of grammar. The top-level productions of a grammar have the start symbol as their left-hand side. Example:
- ROOT→<starting-phrase> <field>|
- ROOT→<starting-phrase> <attributes-list> <connector> <field>|

Logical Output Syntax

The logical output portion of grammar rules may use a variety of symbols and keywords to indicate different types of elements within a CQL query. Below are exemplary symbols used and their meaning.

- ?—domain concepts are preceded by a question mark symbol. Example: ?account
- #—aggregation operation. Example: #SUM ?amount (indicating a sum operation on the values of the "amount" concept).

!—a condition relation. Example: !NUM_LT (indicating a "less than" relation between two numbers that are values of concepts)

< >—the text between the "<" and ">" symbols specifies a value in a condition relation. Examples: <100>, <United States>

&—to specify a conjunction between two conditions. Example: ?amount !NUM-LT <100> &AND ? amount !NUM-GT<10> (indicating that the value of the "amount" concept is to be less than 100 AND greater than 10). Example: ?amount !NUM-LT <100> &OR ?amount !NUM-GT<10> (indicating that the value of the "amount" concept is to be less than 100 OR amount greater than 10).

Below are exemplary keywords used and their meaning.

SORT_BY—specifies the domain concept by which the result is to be sorted. Example: SORT_BY ?amount (indicating results are to be sorted by the values of the "amount" domain concept).

SORT_ASC—specifies that results are to be sorted in ascending order.

SORT_DESC—specifies that results are to be sorted in descending order.

SORT_LIMIT—specifies that a limited number of results are to be generated by a sorting operation. Example: SORT_LIMIT <20> (indicating that the resulting data set is to be limited to the 20 largest or smallest (depending on whether SORT_ASC or SORT_DESC is specified) values of the domain concept named in the SORT_BY portion of the CQL query). The natural language input may express a specific limit, or the parser may use a default limit, e.g., 20.

GROUP_BY—specifies a concept by which the resulting data set is to be aggregated. The particular kind of aggregation to apply is either mentioned explicitly in the input request or may be inferred from the parse tree and domain dictionary. Example: GROUP_BY ?account (indicating results are to be grouped by values of the "account" concept).

Operation of the Grammar Loader

When the grammar loader 127 loads a grammar file for use by the parser, it may transform the human-readable information in that file into a form suitable for processing by the parser. For example, a method such as this may be employed for the example rule,

<A>→<B> <C>|D:

1. Parse the grammar rule to identify the Left-Hand Side symbol, the Right-Hand Side elements, and the Logical Output.
2. Construct a Rule object which has following fields:
   a. lhs—left hand side symbol, Example: <A>
   b. symbols_exp—an array of all the elements in the right-hand side. Example: [<B>, <C>]
   c. symbols_logical—an array of strings that are separated by a space after "|". Example: [D]
3. Set the following objects based on the grammar rule:
   a. lhs_to_rules—A mapping of a symbol to a list of all other rules for which this symbol is on the left-hand side). This is used during parsing to efficiently find all possible expansions of a symbol.
   b. left_parent_table—A mapping of a symbol to all of its possible parent symbols/nodes. Given a natural-language word or a symbol/node, embodiments can use this object to efficiently find all rules where it is referenced on the right-hand side. Embodiments can use it recursively to trace all paths for a symbol up to the ROOT symbol. Embodiments can identify all the symbol's ancestor symbols.
   c. prefix_table—A mapping of the pairs (<A>, <B>) where <A> is the symbol on the left-hand side of a rule and <B> is the first symbol on the right-hand side of the rule) to an array of all rules where <A> is the left-hand side and <B> is the first symbol of the right-hand side. This is used to find the possible prefixes of any symbol. For each ancestor identified in a "left_parent_table" object, embodiments can find all grammar rules where a symbol can exist as a prefix to another.

Value-Concept Data Structure

A value-concept annotation may be employed to identify portions of a natural-language query that correspond to the values of selected concepts. For example, for an instance of the system interfacing with a presidents database, the values of the concepts PRESIDENT-NAME and CITY-OF-ORIGIN that may be stored in the database or derived from data stored in the database may be determined and then stored in a data structure that annotates those values with all concepts for which they are an instance. As an example, in that data structure, "Grover Cleveland" might be annotated with the concept PRESIDENT-NAME, and "Cleveland" might be annotated with both the concepts PRESIDENT-NAME and CITY-OF-ORIGIN. This data structure is employed during parsing as discussed herein.

Parser

The parser processes the information request 111 employing the loaded grammar 124. If the request is recognized by the parser as a valid sentence pattern, a set of parse trees is generated. The parse trees are ordered by the number of grammar rules used in them.

The parser is based on an Earley Parser as known in the art. It is an efficient parsing algorithm with the ability to handle context-free grammars. The parser processes tokens one by one in a left-to-right sequence.

When the parser 120 encounters a non-terminal symbol, it determines all possible ways in which that symbol can be expanded based on the production rules of the grammar 124. The parser iteratively looks at the next word in a sentence and verifies if it matches any of those ways and filters out mismatches.

The parser 120 produces a set of parse trees 125 which are sorted based on the number of grammar rules used in generating each parse tree—ones employing fewer rules are sorted earlier.

Operation of the Parser

1. Input the system may receive an example information request that an operator may enter, for example: "Show Nicolas Weaver's top ten sales by amount in 2021."

2. Pre-Processing

Pre-processing can include cleaning the information request, such as determining whether there are any contractions, such as "isn't", in the input. Pre-processing may also include number conversion, such as converting "10 million" to "10,000,000". This step may also include removing duplicate words and converting the query to lowercase form. In this example, the changes to the query are converting it to lowercase form and converting "top ten" to a number, producing "show nicolas weaver's top 10 sales by amount in 2021".

3. Tokenization

The preprocessed input is tokenized, with tokens delimited, for example, by whitespace or special characters. The tokens resulting from tokenization for this example are: show, nicolas, weaver, 's, top, 10, sales, by, amount, in, 2021.

4. Value-Concept Annotation

The value-concept annotator annotates the values in the tokenized input information request with their relevant concepts. Concepts with their values are stored in a data structure and employed by the value-concept annotator. The annotator processes individual tokens and sequences of tokens (for multi-word values like "Quarrio Corp."). Each individual token and each sequence of tokens is checked against the value-concept data structure. Wherever an exact match is found between a token or token sequence and a value entry in the value-concept data structure, the token or token sequence is annotated with the concept or concepts identified with it. In addition, for each such concept, a transient rule is added to the grammar 124 whose left-hand side is a metasymbol standing for the value of that concept and whose right-hand side is the token or token sequence and whose Logical Output is of the form ?c !STR-EQ v, where c is the name of the concept and v is the value of the concept mentioned in the query. Example: "Nicolas Weaver" is a value for the "sales rep" concept). That token sequence is annotated as salesRep (which is the name of this concept) and the rule <concept-value-term-salesRep>→nicolas weaver|? salesRep !STR-EQ <nicholas+weaver> is added to the grammar. The tokens resulting from concept-value annotation for this example are: show, nicolas weaver (salesRep), 's, top, 10, sales, by, amount, in, 2021.

5. Create One or More Parse Trees

The vector of annotated tokens is processed by the Earley parser using the loaded grammar 124 to find each subset of grammar rules which completely matches the vector. For each such subset, a parse tree as known in the art is created which reflects a successful parse of the token sequence.

Anaphora Processing

In some embodiments, the parser 120 may handle anaphora and ellipsis processing to ensure that queries are accurately interpreted in the context of prior queries.

The parser processes anaphoric references by accessing each parse tree of the previous query, in order by the number of grammar rules employed, and trying to connect the parse tree of the current query with a parse tree of previous query.

1. The starting phrase part of the parse tree of the previous query is added to the parse tree of the current query.
2. If the anaphoric reference is explicit, the parse tree of the current query is merged into the parse tree of the previous query at the node of the explicitly mentioned concept. Example:
   a. Previous Query: List sales in 2020
   b. Current Query: List those sales from US.
   c. The anaphoric reference is explicitly to the "sale" concept (due to the input "those sales").
   d. Connect the portion of the parse tree of the current query representing "sales from US" into the parse tree of the previous query: The merged parse tree reflects the query "List sales from US in 2020."
   e. If the anaphoric reference is not explicitly directed to a previously-mentioned concept, resolve the anaphoric reference as described below and merge the current and previous parse trees accordingly. In this case, anaphora is resolved using one or more of the parse trees of the previous query, relationships among the referenced concepts, the cardinality of the language term referencing the concept used in the input request, and combinations thereof.
      i. Example using parse tree:
         1. Previous Query: List sales in 2020 with their accounts.
         2. Current Query: Which of them are from UK.
         3. Anaphoric reference resolution: "them" refers to the "sales" concept in the previous query because the parse tree indicates that the "sale" concept is the focus of that query and the "account" concept is an attribute of the "sale" concept.
         4. Connect "from UK" into the previous parse tree, which effectively becomes: List sales from UK in 2020 with their accounts.
      ii. Example using relationships among concepts: implicit condition example
         1. Previous Query: List opportunities in 2020 with their accounts.
         2. Current Query: Which of them are in the negotiation stage.
         3. Anaphoric reference resolution: the parser attaches the condition "in the negotiation stage" of the current query to the "opportunity" concept because the "stage" concept can take an "opportunity" concept as a parameter but cannot take the "account" concept as one.
         4. Connect "in the negotiation stage" into the previous parse tree, which effectively becomes: List opportunities in the negotiation stage in 2020 with their accounts.
      iii. Example using cardinality of the language term of the concept used in the input request:
         1. Previous Query: List sales for the top account.
         2. Current Query: List its type.
         3. Anaphoric reference resolution: "its" refers to a singular term. Because the "account" concept in the previous query is referenced in the singular, it is matched to "its" rather than the "sale" concept referenced in the plural.
         4. Connect "type" into the previous parse tree, which effectively becomes: List sales for the top account with its type.

Ellipsis Processing

Ellipsis processing deals with inputs that omit certain words or phrases, relying on context from previous interactions to fill them in. For example, an operator may pose the query, "What were sales by Nicole in 2020?" A follow-up input could be "by Walter," which should be understood to mean "What were sales by Walter in 2020," where "What were sales . . . in 2020" would complete the elliptical query based on the context provided by one or more previous natural-language queries. Embodiments can identify a potential elliptical input when the parser, operating on the loaded grammars, can only produce incomplete parse trees, that is, ones that do not include a ROOT node at the top. For example, the incomplete parse tree for the input "by Walter" is

```
+--<implicit-conditions> → <implicit-condition>
|  +--<implicit-condition> → <implicit-salesRep-person-condition>
|  |  +--<implicit-salesRep-person-condition> → <preposition> <sale-
rep-person-value>
|  |  |  +--<preposition> → of |
|  |  |  +--<sale-rep-person-value> → walter |
```

In such cases, working with the largest incomplete parse tree, the parser can identify the lowest node in the incomplete parse tree which expands to the complete elliptical input. For the input "by Walter", this is,

```
+--<implicit-salesRep-person-condition> → <preposition> <sale-rep-person-value>
|  +--<preposition> → of |
|  +--<sale-rep-person-value> → walter |
```

The parser can substitute the incomplete parse tree for the corresponding portion of the parse tree of the previously successfully-parsed input, that is, the portion having the same node name (corresponding to the grammar rule with the same metasymbol in the rule's left-hand side) as the selected node of the incomplete parse tree. This substitution is evaluated based on the properties of the referenced concepts to determine if it is semantically valid. If not, the parser can select each next-highest node in the incomplete parse tree in turn, and determine if that substitution results in a semantically valid parse tree. Example: The previous query is "List accounts from the telecom industry", and the current query is "in the negotiation stage". In this case, the "account" concept does not have a "stage" attribute, so substituting the condition from the current query into the previous one (yielding "List accounts in the negotiation stage") does not result in a valid (semantically plausible) parse tree.

The first successful substitution results in a parse tree which reflects the system's understanding of the elliptical input. If no successful substitution is found based on selecting any node of the incomplete parse tree, then elliptical processing fails and the system may report that the operator's query was not understood. This process essentially completes the elliptical query using the smallest possible portion of the previous query.

CQL Generator

After the parser has determined one or more parse trees representing successful parses of the operator's input, the CQL Generator 126 processes the collection of parse trees ordered by increasing number of rules employed, and produces a CQL query 122 using the first valid (semantically plausible) parse tree. The CQL Generator 126 processes the parse tree 125 to extract various elements from the logical output parts of the grammar rules. It uses the parent-child relationships among the nodes of the tree structure to aid in generating the CQL. The example input request "Show Nicolas Weaver's top ten sales by amount in 2021" is used as an example for this discussion of the steps employed to generate a CQL query from a parse tree.

1. Process Date Expressions: Using procedures identified by any date-related keywords in the logical outputs of rules within the parse tree, process date values to combine parts of the date expression and generate a value for a "date" concept. Example: COMPUTE_DURATION1 is a keyword that represents a procedure for computing a duration given three (possibly null) arguments that were identified by the parsing process: a modifier (such as "previous" or "next") a numerical interval, and a unit specification (such as "day" or "quarter"). Alternative procedures are available for processing alternative ways to phrase a reference to a duration.
    a. Example: for the query "Show Nicolas Weaver's top ten sales by amount in 2021", "in 2021" is processed by the COMPUTE_DURATION1 routine to produce "y_2021" (meaning the year 2021).
2. Process Aggregations: If an aggregation-related term within the parse tree structure is found, append an aggregation operation to the logical output. Example: in the query "List the total amount of opportunities", the aggregation-related term "total" is followed by a reference to the "amount" concept. The parse tree indicates that the aggregation-related term is immediately followed by the "amount" concept. The system thus applies the "total" aggregation to the "amount" concept.
3. Find parameter concept: As described herein, some concepts defined in the domain dictionary may have a parameter, whose value is another domain concept. When the parse tree references a parameterized concept, the system uses the structure of the parse tree and the properties of the concepts it references to identify which of them is the value of its parameter. Using the concept properties stored in the domain dictionary, a list of possible parameter concepts is fetched. Then using the parse tree structure, one of the concepts from the list of candidate concepts is selected as the parameter based on its proximity to and relation with the parameterized concept in the parse tree. Example: for the query "List details of opportunities with their accounts", where the "detail" concept can take either "opportunity" or "account" as a parameter concept, the structure of the parse tree indicates that the "detail" concept is an attribute of the "opportunity" concept in this sentence. Hence, the "opportunity" concept is assigned as the parameter concept of the "detail" concept.
    a. Example: for "Show Nicolas Weaver's top ten sales by amount in 2021", "amount" is a parameterized concept and "sale" is assigned as its parameter based on its relationship to "amount" (via the token "by") in the parse tree and because "sale" is defined in the domain dictionary as a valid parameter of the "amount" concept.
4. Generate a CQL expression:
    a. Get output concepts from the parse tree. All grammar rules from the parse trees are traversed to collect output concepts. The following concepts are added to the output concepts:
        i. Concepts that are explicitly asked in a query.
        ii. Concepts that are referenced after "order by".
        iii. Concepts that are referenced after "group by".
        iv. Concepts that are mentioned in conditions that are specified in the input request in certain cases:
            1. If the concept mentioned in the condition is of type 'date' and the output type is not a chart. Example: "List opportunities closing in this month".
            2. If the concept mentioned in the condition is of a number or currency type. Example: "Show opportunities above $20,000".
            3. If the concept mentioned in the condition is of type 'string' and the condition has more than one value. Example: "List accounts from US or UK".
        v. Example: for the query "Show Nicolas Weaver's top ten sales by amount in 2021", the "sale" and "amount" concepts are set as output concepts.

b. Get conditions/filters to apply from the parse tree including which concept applies to each condition, which operation is specified by the condition, and what value to apply for the condition. The logical output portion of a grammar rules may specify only part of a condition. This step gathers all the parts of a condition from subordinate nodes in the parse tree and associated the full condition expression with the highest node that references part of the condition expression. Example: "?saleRepPerson !STR-EQ<Nicolas Weaver>". Different condition patterns are processed to extract condition concept, relation, value and inter-condition relation. Example condition patterns include:
   i. ?CONCEPT !RELATION <VALUE>
      1. Example: sales rep is Nicolas Weaver.
   ii. ?CONCEPT !RELATION <VALUE1> &INTER-CONDITION-RELATION !RELATION <VALUE2>
      1. Example: created date is before 2025 and after 2023.
   iii. ?CONCEPT !RELATION <VALUE1> &INTER-CONDITION-RELATION <VALUE2>
      1. Example: country is USA or Japan.
   iv. ?CONCEPT !RELATION-BTWN <VALUE1> &AND <VALUE2>
      1. Example: amount is between $20,000 and $40,000.
   v. Example: for the query "Show Nicolas Weaver's top ten sales by amount in 2021", the following conditions are extracted:
      1. Condition 1: saleRepPerson STR-EQ Nicolas Weaver
      2. Condition 2: dateDC DATE-IN y_2021 c. Get any sorting instructions from the parse tree including what concept to sort on, how to sort and any limit to apply to the number of output rows. The structure and content of the parse tree specifies the type of sorting requested and on what concepts to apply the sorting. The relevant grammar rules contain specific keywords like "SORT_ASC", "SORT_DESC", "SORT_BY" to indicate different types of sorting request. For simple cases like "top" or "least", the sorting limit is specified immediately after these terms in the input query. The concept by which the requested data set is to be ordered may be specified at a plurality of positions within the input query, as in "List top 3 sales in 2020 with their accounts by amount" and "List top 3 sales by amount in 2020 with their accounts." In such cases, the parse tree identifies that the output is to be sorted by the values of the "amount" concept.
   i. Example: for the query "Show Nicolas Weaver's top ten sales by amount in 2021", the output is to be sorted by values of the "amount" concept in descending order, and the output is limited to 10 output rows.
      1. Sorting Concept: Amount
      2. Sorting Order: Descending
      3. Sorting Limit: 10 d. Get any grouping instructions from the parse tree including what concept to aggregate results on. indicates in its grammar rules if any result is to be grouped on any concept. A grammar rule in the parse tree may include the keyword ("GROUP_BY") in its logical output, which indicates that retrieved data should be grouped by the concept following it. Example: "List total sales by sales rep" where the grammar rule for the word "by" has a "GROUP_BY" keyword in its logical output portion and it is followed by a reference in the query to the "sales rep" concept.
   i. Example: for query "Show Nicolas Weaver's top ten sales by amount in 2021", there are no grouping instructions.

e. Update all the concepts in the CQL expression using relationships among them and their properties. If two concepts are specified in the logical outputs within a parse tree in output fields having a one-to-many relationship, apply an aggregation on the concept on the "many" side of the relationship. The type of aggregation depends on the type of the concept to be aggregated. For example, a COUNT aggregation will be applied to a string-valued concept like "account" but a SUM aggregation will be applied to a number/currency-valued concept like "amount". For example, for the query "Show sales of accounts," the "account" concept would be identified as a parameter of the "sale" concept. Attributes of the "sale" concept definition indicate that "account" is a valid parameter value, and that the values of "sale" are of type "currency." Thus, the aggregation is specified in the CQL snippet as a SUM operation.
   i. Example: for query "Show Nicolas Weaver's top ten sales by amount in 2021", there are "sale" and "amount" concepts as output concepts, and they have a one-to-one relation. Hence, there is no need to apply any aggregation.

f. Get the output type from the parse tree. If the logical output of a rule in the parse tree includes any keywords specifying a presentation type, use that as the output type.
   i. Example query: "Show sales as a bar chart."
      1. The parse tree has the following rules with specific keywords related to presentation type.
         a. <present>→show|$displayAs_Chart
         b. <present-type>→bar chart|$displayAs_BarChart
      2. The parse tree includes a generic presentation specification of "Chart" (derived from the input "Show") as well as a presentation specification of "BarChart" (derived from the input "as a bar chart"), which is a specialization of "Chart". In such cases, the more specific chart type is used as the presentation specification. For the current example, BarChart is set as the presentation specification in the CQL.
   ii. Example: for the query "Show Nicolas Weaver's top ten sales by amount in 2021", the generic Chart type is set as the output type.

g. Generate paraphrase: Embodiments can generate a paraphrase response to the operator depicting what is understood by the system. The paraphrase is generated using a template-based approach. Print names of referenced concepts (retrieved from the domain dictionary 147) and other components of the CQL are placed into the template to generate the paraphrase text.
   i. Example: for the query "Show Nicolas Weaver's top ten sales by amount in 2021", the generated paraphrase is "Show top 10 sale ordered by sale amount where sale rep is Nicolas Weaver, close date is between 2021-01-01 and 2021-12-31."

Resulting CQL query for the example:

```
{
  "outputType": "Chart",
  "paraphrase": "Show top 10 sale ordered by sale amount where sale rep is Nicolas
Weaver, close date is between 2021-01-01 and 2021-12-31",
  "outputConcepts": {
    "0": { "concept": "sale"},
    "1": { "concept": "amount", "contextConcept": "sale" },
    "2": {"concept": "dateDC", "contextConcept": "sale"}
  },
  "conditions": {
    "0": {
      "attr": { "concept": "saleRepPerson"},
      "relation": "STR-EQ",
      "value": "Nicolas Weaver"
    },
    "1": {
      "attr": {"concept": "dateDC", "contextConcept": "sale"},
      "relation": "DATE-IN",
      "value": { "defaultValue": "y_2021", "type": "DATE"}
    }
  },
  "sorting": {
    "sortingOrder": "DESCENDING",
    "sortingLimit": "10",
    "orderBy": {"concept": "amount", "contextConcept": "sale"}
  }
}
```

Example CQL Produced by the CQL Generator

In one example, the operator 110 can present a request 111 similar to the following: "WHEN WAS THE LAST PRESIDENT FROM CALIFORNIA ELECTED?" The language processing subsystem 128 can use the grammar 124 to translate the request 111 into a CQL query 122, such as one similar to the following:

```
{
  "conditions": {
    "0": {
      "attr": {
        "concept": "HomeState",
        },
        "relation": "=",
        "value": "California"
      }
  },
  "retrievals": {
      "0": {
          "concept": "LastElection Year",
      }
  }
}
```

As further described herein, the CQL query 122 can reference a set of domain concepts, such as LastElectionYear and HomeState, and their values, which are not necessarily present in the same form in the database schema or data values associated with a target database. For example, the target database might include a table having fields for PRESIDENT-NAME, TERM-START-DATE, TERM-STOP-DATE, and CITY-OF-ORIGIN, instead of these identified domain concepts. In such cases, the CQL query 122 would have to be further translated to reference the actual fields of the target database, as part of the translation from CQL to a language specific to the DBMS that manages the target database, such as that employed by database request 151.

In such cases, the CQL query 122 might differ substantially from the equivalent one or more database-specific queries (that is, queries specific to the target database(s)), depending on the database schema(s) for the target database(s), and the specifics of the DBMS query language(s). Moreover, the language processing subsystem 128 would resolve ambiguities such as whether "FROM CALIFORNIA" refers to residence at the time of election (e.g., Ronald Reagan) or to birthplace (e.g., Richard Nixon). It would create a snippet 122*a* in the CQL query 122 expressing the disambiguated domain concept, for example, ResidenceAtElection or Birthplace. Alternatively, the system may record the ambiguity and ask clarification questions of the user to disambiguate what "FROM CALIFORNIA" means in the request 111.

The system 100 can also include a presentation subsystem 130 coupled to the output interface 102, and a presentation rule set 131 accessible by the presentation subsystem 130. Employing presentation requirements 123 that the parser extracted from the natural language query, such as the type of output (e.g., value, table, chart) and the order of presentation (e.g., the order of columns within a table), together with rules in the rule set that express presentation conventions, the presentation subsystem 130 can compose an appropriate presentation of the domain concepts and their values.

The system 100 can also include a data access subsystem 140 coupled to the language processing subsystem 128 and to the presentation subsystem 130, and a domain dictionary 147 accessible by the data access subsystem 140. The system can also include a dictionary interface 103 coupled to the domain dictionary 147. In one embodiment, the data access subsystem 140 can receive the CQL query 122 from the language processing subsystem 128. The data access subsystem 140 can process the CQL query 122 using the domain dictionary 147 (such as accessing the domain dictionary 147 using the dictionary interface 103) and can provide one or more database requests 151, such as an SQL query, suited to a target DBMS 150.

The system can also include a data access subsystem 140 coupled to a DBMS 150, or more than one such DBMS 150. The data access subsystem 140 can be disposed to access the DBMS 150, which is itself disposed to access one or more databases 153; neither the DBMS 150 nor the database 153 is necessarily part of the system 100. The data access subsystem 140 can present the database request 151 to the DBMS 150, and can receive a raw dataset 152 from the DBMS 150, such as a dataset consistent with the database schema associated with the database 153. For example, in the case described above, the system 100 might obtain a raw dataset 152 from the target database, including the values requested for TERM-START-DATE and TERM-STOP-DATE by the database-specific query.

The data access subsystem 140 can be disposed to process the raw dataset 152 using the domain dictionary 147 and can provide a processed dataset 132 to the presentation subsystem 130. For example, the data access subsystem 140 can provide the processed dataset 132 including a value for LastElectionYear that is determined from the value of TERM-START-DATE.

The presentation subsystem 130 can be disposed to use the presentation rule set 131 to determine how to present the processed dataset 132 to the operator 110. For example, in the case described above, the system 100 might simply display the requested value for LastElectionYear. For another example, in the case of a request 111 with multiple records to return, the presentation subsystem 130 can use the presentation rule set 131 in conjunction with the presentation requirements 123 to determine whether to present data as a chart, a table, or both, what type of chart to present, how to organize the processed dataset 132 as rows and columns in a table, how to organize the processed dataset 132 as visual elements in a chart (such as placing a time-valued concept on the x-axis of a graph), and whether to aggregate any values.

Having determined how to organize the processed dataset 132 for presentation, the presentation subsystem 130 can provide a display of the processed dataset 132 to the operator 110 as the response 112.

Data Access Subsystem

Figure 2:
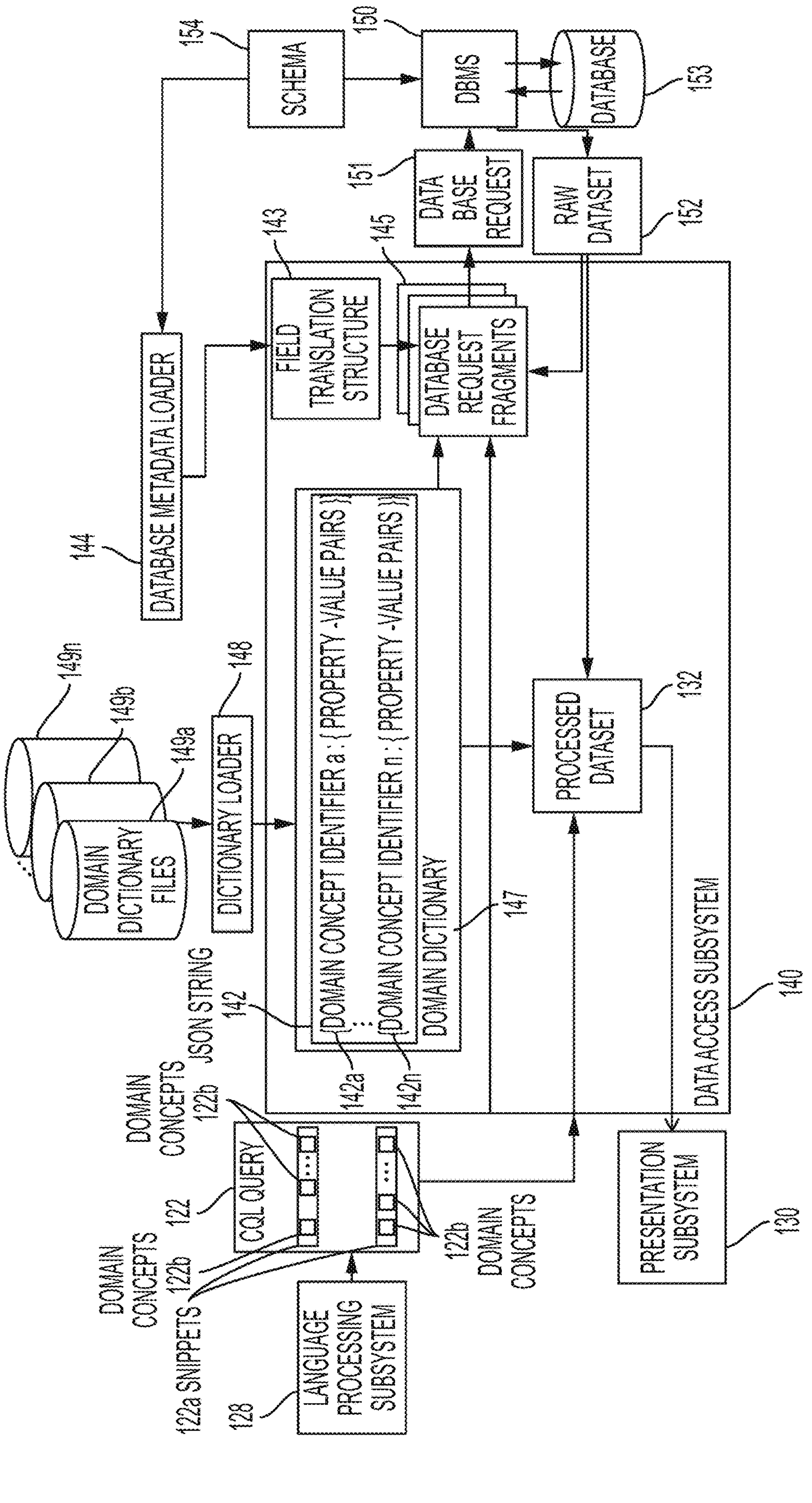
FIG. 2 shows a conceptual drawing of an example data access subsystem according to example embodiments.

The system 100 can also include a data access subsystem 140 as depicted in FIG. 2. It may comprise a domain dictionary 147. In one embodiment, the data access subsystem 140 may employ a Dictionary Loader 148 to process a collection of dictionary files 149*a-n* to compose a domain dictionary 147 comprising one or more domain concept definitions 142*a-n*, as further described herein. In one embodiment, the data access subsystem 140 can use the one or more domain concept definitions 142*a-n* within domain dictionary 147 to interpret CQL query 122 and to generate one or more commands to the one or more DBMSs which manage the data associated with the concepts referenced in that query. The datasets associated with those commands may be used in composing further database commands and/or processed into a processed data set 132 containing the requested concept values. Alternative embodiments may employ other means of processing the CQL query 122 and generating a processed data set 132. For example, machine learning techniques, "word vector" and related techniques, and other techniques, can be used to process the CQL query 122 and generate a processed data set 132.

The data access subsystem 140 can be incorporated into the system 100 as described with respect to FIG. 1, or can otherwise be incorporated into the system 100. For example, in alternative embodiments, the data access subsystem 140 can be located remotely from the system 100. In such cases, the data access subsystem 140 can respond to requests from the system 100, such as from the language processing subsystem 128, and can provide responses to the system 100, such as to the presentation subsystem 130. The data access subsystem 140 can include its own collection of domain dictionary files 149*a-n*, or the domain dictionary files 149*a-n* can themselves be located remotely from the data access subsystem 140 and from one another, and can maintain information responsive to requests from the data access subsystem 140. The data access subsystem 140 can access the domain dictionary 147 and its domain concept definitions 142*a-n* and obtain responsive information.

CQL Query

In one embodiment, the data access subsystem 140 can be coupled to the language processing subsystem 128 and disposed to receive the CQL query 122. The CQL query 122 can describe characteristics of the desired dataset that should result from evaluating the CQL query 122.

For example, the CQL query 122 can include one or more snippets 122*a*. In such cases, snippets 122*a* can have the following types:

- A request to derive a value associated with a domain concept from information in the database 153, and to return that value within a resulting dataset.
- A Boolean expression indicating conditions on domain concepts to be satisfied for the requested domain concepts to be added to the resulting dataset.
- A function to be applied to the records of the resulting dataset. For example, functions can be disposed to determine a count of elements in the dataset, to determine a maximum or minimum element of the dataset, to perform an aggregation such as determining the sum of values of elements of the dataset, to determine whether an element is present in the dataset, or to modify one or more elements of the dataset.

For example, deriving a value associated with a domain concept from information in the database 153 can include steps of modifying elements of the retrieved dataset, such as capitalizing names or titles, transforming dates or numbers to word strings, or otherwise reformatting values appearing in the dataset into a form specified in the domain dictionary. For another example, modifying elements of the dataset can include correcting spelling errors, deleting duplicate and outlier values, or otherwise adjusting a population of values in the resulting dataset.

In alternative embodiments, one or more capabilities of the underlying DBMS 150 may be employed, such as by the data access subsystem 140 providing DBMS-specific instructions, to achieve an effect similar or equivalent to one or more operations described by one or more snippets 122*a*.

For example, as further described above, the CQL query 122 can include snippets 122*a* that can include a request for values of domain concepts, such as:

```
{
  "concept": "LastElection Year",
  or a restriction on the values of domain concepts, such as:
  "attr": {
    "concept": "HomeState",
  },
  "relation": "=",
    "value": "California"
}
```

Other and further types of snippets 122*a* are not shown in this example, but could be included in different CQL queries 122.

In alternative embodiments, other syntactic forms of CQL query 122 known in the art, such as ones incorporating scoping and quantization, may be employed.

Domain Dictionary

The data access subsystem 140 can also be coupled to the domain dictionary 147.

In one embodiment, the domain dictionary 147 can be implemented as a text string in JSON format 142, although other data structures (such as a table, a network, a Lisp association-list, or otherwise), may be used. When the domain dictionary 147 is implemented as a text string in JSON format 142, each domain concept definition 142*a* can be expressed as an object having values for some or all of the following properties:

A domain concept identifier. The data access subsystem 140 can use this identifier to access definition information about the concept.

One or more parameters. As described herein, domain concept definitions 142*a* may include parameters, whose values can include domain concepts. For example, as described herein, a domain concept "duration" can be parameterized by the length of time, such as "duration (month)".

One or more fields. Names of one or more database fields from which the domain concept, or computations employing values of the domain concept can be derived. Each domain concept will have one primary field name associated with it, and may have associated one or more supplementary field names and an ID field name or key. For example, the primary field name could be first name, the supplementary field(s) could be first and last name, and the ID can be a unique identifier established by the operator's organization.

One or more extraction procedures. These may be procedural code or names of procedures that extract or derive a value for a domain concept from the values of one or more fields in the database. Alternatively, a collection of concept-specific parameters may be employed for directing the operation of a single extraction procedure employed for a plurality of concepts.

One or more restriction procedures. Procedural code or names of procedures that restrict database queries such that those requests retrieve those records that correspond to the specified values (or ranges of values) of the domain concept. Alternatively, a collection of concept-specific parameters may be employed for directing the operation of a single restriction procedure employed for a plurality of concepts. In alternative embodiments, restriction and extraction procedures can be combined into a single procedure that conditionally implements the functionality of both.

Concept type. A data type associated with the domain concept. For example, possible values can include: a time (such as a date-time group), a string, an integer, a currency value, a percentage, a floating-point value, or a tuple of other values. The data type of a concept may be more general than the data type(s) of the fields in the database from which the concept values are computed. For example, an "amount" concept may have the type "Currency", but the corresponding field's or fields' data type can be more specific, such as "Double Precision Floating Point" or "Integer", depending on how the concept is implemented with a particular database.

Print name. A human-readable name of the domain concept. This can be employed, for example, in creating column headings and axis labels in tables and charts. As another example, it can be employed in producing natural-language paraphrases of CQL queries.

Clarification query. Information from which a query to the operator or invoking data access subsystem 140 requesting a value for the domain concept can be computed. This can be employed to create clarification dialogues when the query in the CQL language does not specify a value for a domain concept that is required.

Developing the Request to Database

In one embodiment, the data access subsystem 140 can obtain concept definitions 142*a-n* from the domain dictionary 147. It can access the domain dictionary 147 and the Field Translation structure 143 to determine the procedures (such as extraction procedures or restriction procedures) with which to operate on the fields of the database 153, to achieve the desired effect of each snippet 122*a* that references the domain concept. For one example, the data access subsystem 140 can determine which procedure is required to perform the operation requested by the particular snippet 122*a* in response to the syntax of that snippet 122*a*. This information may be stored in the domain dictionary 147 and the Field Translation structure 143, and may be used in conjunction with each snippet 122*a* to derive which database fields are to be accessed, any database fields associated with restrictions or filters, any database fields associated with sorting, any database fields associated with grouping, any database fields associated with computations, and any database fields associated with aggregations.

The elements of the CQL query 122 may then be processed into substrings of one or more database-dependent requests to a database management system ("DBMS"), such as one or more SQL statements. In an embodiment which generates SQL statements, for example, the substrings may consist of any or all of a Select String, a From string, a Where string, a Group By string, an Order By string, an Inner Query String, and Multi-Query strings.

In response to CQL query 122, the data access subsystem 140 can provide a sequence of one or more database requests 151, each in the appropriate format for the associated database. This may entail extracting values from one or more intermediate raw datasets for incorporation into the database request.

In one embodiment, the domain dictionary 147 is disposed so that each domain concept is defined without reference to any other domain concept. Optionally, a domain concept can be parameterized to refer to one or more other domain concepts as parameters. For example, a domain concept "duration" can be parameterized by the length of time, such as "duration (month)", with the effect that a common operation to derive any of a set of durations (such as year, quarter, month, week, day, hour) from data fields in a database can be specified by a single domain concept definition 142*a* without undue complexity. Similarly, a database 153 of Presidents can also include a second table containing the names of states together with their postal abbreviations. With this second table present, a domain concept "PostalAbbreviation (State)" may be defined, where "State" could take the values of the domain concepts "ResidenceAtElection" or "Birthplace".

This can have the effect that preparing information that defines domain concepts can proceed without substantial checking for dependencies. For example, when each domain concept is defined without reference to any other domain concept, the dictionary writer preferably needs to check just for multiple definitions of the same domain concept, or for circular references among parameterized domain concepts.

The data access subsystem 140 sends each database request 151 in a format specific to the DBMS 150 managing the database 153. The DBMS 150 can apply the database request 151 to the schema information 154 of the database 153 to provide a raw dataset 152 to the data access subsystem 140.

In response to the raw dataset 152, the data access subsystem 140 can use snippets 122*a* and information from the domain dictionary 147 to provide subsequent database queries, which may, for example, comprise restrictions on values of database fields that are derived from values drawn from the raw dataset. Alternatively, if all the information specified by all the snippets 122*a* has been processed, the data access subsystem 140 can use snippets 122*a* and information from the domain dictionary 147 to provide a processed dataset 132.

For example, in response to one or more entries in the domain dictionary 147, the data access subsystem 140 can perform one or more of the following functions:

- retrieve its value directly from a field in the database 153, if the data types of the domain concept and its associated field were identical;
- retrieve its value from a field in the database 153 and transform that value to the type associated with the domain concept, as specified in the domain dictionary 147;
- derive its value by retrieving all or parts of one or more fields in the database 153, possibly incorporating type conversions as described above;
- restrict the entries retrieved in the raw dataset 152 based on the value of a field in the database 153, if the value associated with the domain concept corresponds to the value in the database 153 and their data types are substantially identical;
- restrict the entries placed in the processed dataset 132 in response to the transformed value of information maintained by the database 153, when that information corresponds with the domain concept, but that information's data type is different;
- restrict the entries placed in the processed dataset 132 in response to values of all or parts of one or more fields maintained by the database 153, incorporating type conversions as described above, when necessary;
- provide information for presenting a request for clarification to the operator 110, or for another entity in response to an under-specified portion of a CQL query. For example, if the CQL query does not specify a time range, the domain concept definition for the concept "AverageSalesRevenuePerSales-person (Timeperiod)" can include a clarification query for determining the time range over which revenue is to be averaged, such as "Over what period (e.g., year to date, last month, the month of May)?";
- specify one or more presentations for the presentation subsystem to display to operator 110, or for another entity.

In one case, the request for "WHEN . . . ELECTED" in the example request 111 presented above can be translated by the language processing subsystem 128 into the domain concept for LastElectionYear and a snippet 122*a* such as:

```
{
  "concept": "LastElection Year",
}.
```

The data access subsystem 140 can retrieve a domain concept definition 142*a* from the domain dictionary 147 corresponding to the domain concept LastElectionYear. When the database 153 includes a field for TERM-START-DATE, the data access subsystem 140 can, in response to the domain concept definition 142*a* associated with that domain concept, extract the value of TERM-START-DATE, compute the year for the election year just prior to that TERM-START-DATE, and (possibly) transform its data type to that of the concept LastElectionYear. When the database 153 includes a different field or fields that contain the relevant information, the domain concept definition 142*a* can include a different method of deriving LastElectionYear.

When the request 111 asks for values associated with specific values of that domain concept, an associated snippet 122*a* can ask for the retrieved records to be restricted in response to that domain concept. The method of restriction can include specifying one or more database 153 fields whose values are to be compared with restricting values, and how they are to be compared.

In one case, the restriction of "FROM CALIFORNIA" in the example request 111 presented above can be translated by the language processing subsystem 128 into the domain concept for HomeState and a snippet 122*a* such as:

```
{
  "attr": {
    "concept": "HomeState",
  },
  "relation": "=",
  "value": "California"
}
```

If, for example, the database 153 includes a table having a field for PRESIDENT-NAME and CITY-OF-ORIGIN, the data access subsystem 140 can retrieve an entry for the domain concept HomeState from the domain dictionary 147, compute a state associated with CITY-OF-ORIGIN, and compare that associated state with "California". Alternatively, if the database 153 includes an additional table having a field for STATE and CITY, the data access subsystem 140 can create a command to the DBMS 150 to retrieve from that table a list of cities associated with the value CALIFORNIA, potentially employ appropriate type conversion, and determine whether the value for CITY-OF-ORIGIN is within that list.

When the request 111 asks for one or more values of that domain concept, an associated snippet 122*a* can ask to include those values in the processed dataset 132. The method of presentation can comprise including at least some portions (and possibly all) of one or more database 153 fields whose values are to be aggregated, sorted, or otherwise processed, and how these operations are to be performed.

In one case, the restriction of "WHEN WAS THE LAST . . . " in the example request 111 presented above can be translated by the language processing subsystem 128 into a snippet 122*a* such as:

```
{
  "concept": "LastElection Year",
}
```

Thus, the language processing subsystem 128 can transform a reference to the "LAST" such object into a snippet referencing a LastElectionYear concept, regardless of how the information from which ELECTION-YEAR can be determined is maintained in the database 153. In this example case, the value of LastElectionYear can be determined in response to TERM-START-DATE, and a maximum operation can be computed on the set of all responsive values.

When the request 111 asks to insert one or more values of that domain concept 122*b*, an associated snippet 122*a* can ask to insert those one or more values into the database 153. The method of insertion can include identifying one or more database 153 fields whose values are to be determined, inserted, or otherwise processed, and how these operations are to be performed.

In one case, in the example request 111 presented above, the operator might make a request adding a new election such as

"GEORGE WASHINGTON FROM VIRGINIA WAS ELECTED IN 1792".

This can be translated by the language processing subsystem 128 into an insertion command expressed in the format of the CQL query 122 having the domain concepts 122*b* associated with each entry for an election, including a tuple for {PresidentName, ElectionYear, HomeState}, and possibly otherwise. In such cases, the data access subsystem 140 can retrieve entries 142*a-n* from the domain dictionary 147 associated with the domain concepts 122*b* and with the purpose of inserting one or more values into the database 153. In such cases, the data access subsystem 140 can optionally request additional information from the operator, shown by the domain dictionary 147 to be needed for the target database 150, such as CITY-OF-ORIGIN associated with HomeState.

The data access subsystem 140 can receive the CQL query 122 from the language processing subsystem 128, as further described herein. The data access subsystem 140 can identify the snippets 122*a* comprising the CQL query 122. The data access subsystem 140 extracts information from the domain dictionary 147 in response to each such snippet 122*a* that references a domain concept. In one embodiment, every snippet 122*a* references a domain concept; however, in the context of the invention, there is no particular requirement for any such limitation; it is possible for some snippets 122*a* to fail to reference any domain concept.

The information requested from the domain dictionary can include a domain concept definition 142*a* derived in response to the associated snippet 122*a*.

The data access subsystem 140 can determine a domain concept definition 142*a* (specified by an entry in the domain dictionary) in response to the domain concept identifier of domain concept definition 142*a*, and can employ one or more properties of the domain concept definition 142*a* to compose one or more database request fragments 145 of one or more database requests 151.

The data access subsystem 140 can employ information in the domain dictionary 147 to derive one or more database request fragments 145 of a database request 151. The fragments 145 can include one or more database elements, such as fields, which can be directly accessed from the database 153 using a database-dependent and DBMS-dependent request 151.

The data access subsystem 140 can be responsive to one or more database request fragments 145 of the request, possibly also in response to the original CQL query 122, to derive the database request 151. The data access subsystem 140 can present the database request 151 to the appropriate DBMS 150 for operation.

Processing Response to Request

The data access subsystem 140 can receive a raw dataset 152 from the database 153, in response to the database request 151, as further described herein. The data access subsystem 140 can identify the database elements, such as database rows or fields, included in the raw dataset 152.

Depending on the nature of the CQL query 122 and the databases 153, information from the raw dataset 152 may be employed by the data access subsystem 140 to compose additional database requests 151 to be processed as further described herein. In one alternative embodiment, the raw dataset 152 can include some or all of the elements needed to produce the processed dataset 132. In another alternative embodiment, the raw dataset 152 can be integrated with one or more previously retrieved raw datasets 152, such as using join operations or other database operations that are typically performed by the DBMS itself. In yet another alternative embodiment, data from a first raw dataset 152 can be processed and integrated into one or more additional database requests 151. In this way, embodiments can use data returned from a database query to generate iteratively additional queries depending on the natural-language query and the structure of the databases being accessed.

Information in the dictionary entries for the domain concepts 122*b* expressed in the snippets 122*a* of the CQL query, including one or more methods for combining those elements, computing values of domain concept 122*b* in response to those elements, or otherwise determining information not directly available from the database 153 using a database-dependent request, can be employed to compose values of domain concept 122*b* for inclusion in the processed dataset 132.

Example Method of Use

Figure 3:
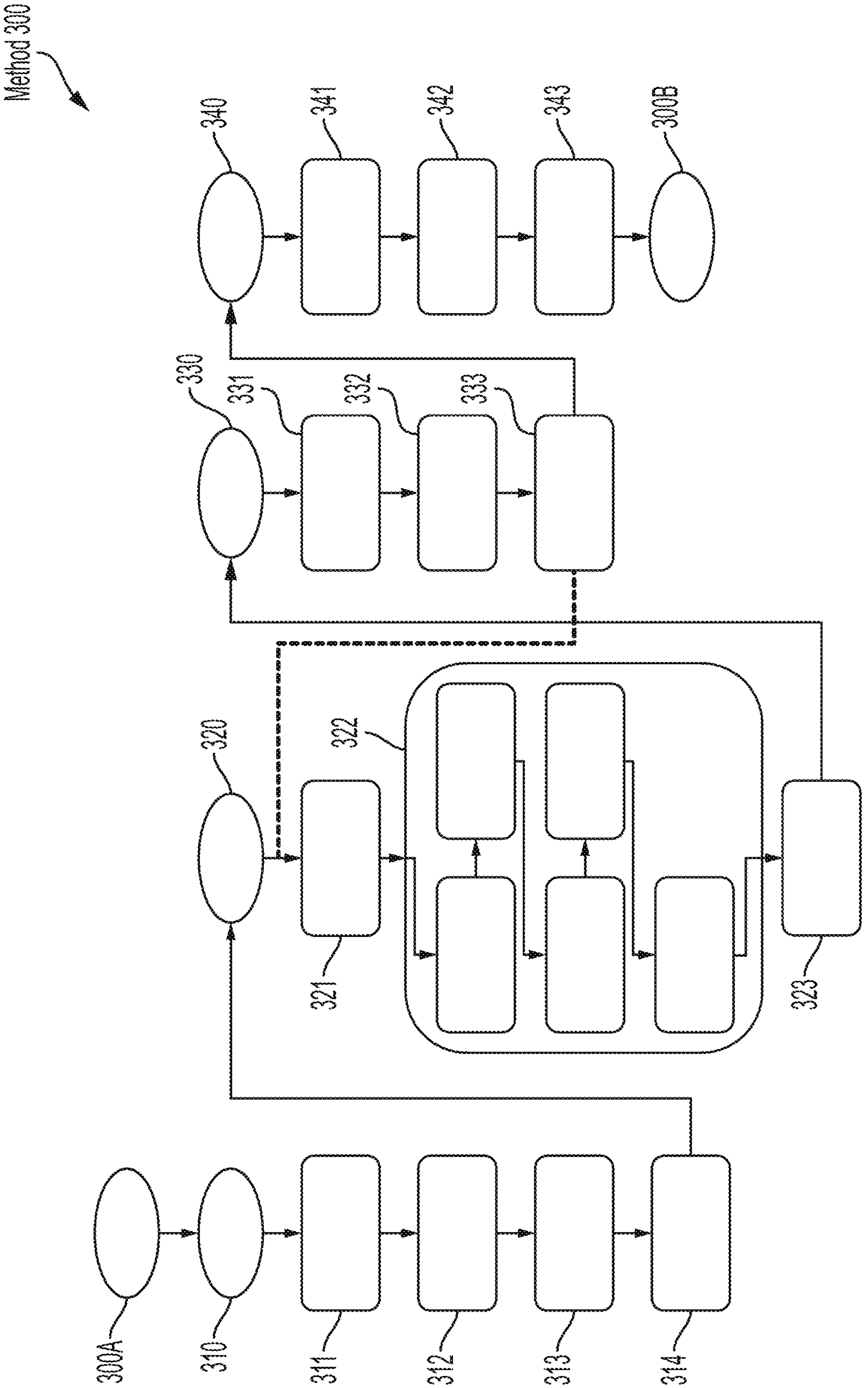
FIG. 3 shows a conceptual drawing of an example method of using an example system.

FIG. 3 shows a conceptual drawing of an example method of using the example system.

A method 300 can include flow points and method steps as described herein. Although these flow points and method steps are (by the nature of the written word) described in a particular order, in the context of this embodiment there is no particular requirement for any particular order. For example, this description does not limit the method to this particular order. They might be performed in a different order, or concurrently, or partially concurrently, or otherwise in a parallel, pipelined, quasi-parallel, or other manner. They might be performed in part, paused, and returned to for completion. They might be performed as co-routines or otherwise. One or more portions of the method 300 are sometimes described herein as being performed by particular elements of the system, or sometimes by "the method" itself. When a flow point or method step is described as being performed by "the method," it can be performed by one or more of those elements, by one or more portions of those elements, by an element not described with respect to the figure, by a combination or conjunction thereof, or otherwise.

Although the method is described as though the natural language query can be processed by accessing a single database, there is no particular requirement for all the information required to process the query to reside in a single database. Methods known in the art can be employed to enable the method to access a multiplicity of databases, which may be managed by a multiplicity of DBMSs.

Beginning of Method

A flow point 300A indicates a beginning of the method.

Receiving Natural-Language Query

At a flow point 310, the system 100 is ready to receive a request 111, such as one expressed in a natural language.

Initiation steps to create grammar and dictionary structures and field translation structure?

At a step 311, the language processing subsystem 128 receives a request 111 from the operator 110, such as one expressed in a natural language.

At a step 312, the language processing subsystem 128 accesses the grammar 121 and translates the request 111 into the CQL query 122.

At a step 313, the language processing subsystem 128 prepares and sends a data structure, such as the CQL query 122, to the data access subsystem 140, and prepares a data structure specifying any presentation requirements 123 it has gleaned from the request 111.

At a step 314, the language processing subsystem 128 sends the data structure specifying any presentation requirements 123 to the presentation subsystem 130. In one embodiment, the presentation requirements 123 can be sent to the presentation subsystem 130 when they are generated; however, in the context of this embodiment, there is no particular requirement for any such limitation. For example, the presentation requirements 123 could be reserved until they are needed, at a later time, by the presentation subsystem 130, such as after the domain dictionary 147 has prepared the processed data set.

The method proceeds with the next flow point.

Translating CQL Query

At a flow point 320, the system 100 is ready to translate the CQL query 122 into the database request 151.

At a step 321, the data access subsystem 140 receives the CQL query 122 from the language processing subsystem 128.

At a step 322, the data access subsystem 140 accesses the domain dictionary 147 and Field Translation structure 143 and translates the CQL query 122, which references domain concepts **122*b*, into a database request 151**, which references database elements.

At a sub-step **322*a*, the data access subsystem 140 identifies each snippet 122*a* in the domain concept portion of the CQL query 122, whose purpose is to provide values associated with domain concepts 122*b*. For each snippet 122*a*, the data access subsystem 140 accesses the domain dictionary 147 for the retrieval method associated with that domain concept 122*b*, applies any retrieval procedures associated with that domain concept 122*b*, and creates one or more database request fragments 145 in the request language, such as fragments of a SELECT clause in the SQL language, associated with the particular DBMS 150 that manages the database 153**, from the associated retrieval method.

At a sub-step **322*b*, the data access subsystem 140 identifies each snippet 122*a* in the conditions portion of the CQL query 122, whose purpose is to restrict retrieval of information in response to particular values associated with domain concepts 122*b*. For each such snippet 122*a*, the data access subsystem 140 accesses the domain dictionary 147 for the restriction method associated with that domain concept 122*b*, applies any restriction procedures associated with that domain concept 122*b*, and creates one or more database request fragments 145 in the request language, such as fragments of a WHERE clause in the SQL language, associated with the particular DBMS 150 that manages the database 153**, from the associated restriction method.

At a sub-step **322*c*, the data access subsystem 140 processes the database request fragments 145 and information drawn from the database schema to identify specific data sources, such as table names in a relational database, or linkages among them, for example joins in a relational database, and creates one or more database request fragments 145** in the request language, such as fragments of a FROM clause in the SQL language.

At a sub-step **322*d*, the data access subsystem 140 identifies each snippet 122*a* in the CQL query 122 specifying an aggregation. For each such snippet 122*a*, the data access subsystem 140 creates one or more database request fragments 145** in the request language, such as fragments of a GROUP BY clause in the SQL language.

At a sub-step **322*e*, the data access subsystem 140 identifies each snippet 122*a* in the CQL query 122 whose purpose is to specify a sorting of values of associated domain concepts 122*b*. For each such snippet 122*a*, the data access subsystem 140 creates one or more database request fragments 145** in the request language, such as fragments of an ORDER BY clause in the SQL language.

At a sub-step **322*f*, the data access subsystem 140 identifies each snippet 122*a* in the CQL query 122 whose purpose is to insert information into the database 153 in response to associated domain concepts 122*b*. For each such snippet 122*a*, the data access subsystem 140 accesses the domain dictionary 147 for the insertion method associated with that domain concept 122*b*, and creates one or more database request fragments 145** from the associated insertion method.

At a sub-step **322*g*, the data access subsystem 140 integrates the one or more database request fragments 145 developed in sub-steps 322*a*, 322*b*, and 322*c*, into a unified database query. For example, the data access subsystem 140 can collect SQL clauses such as SELECT, WHERE, FROM, GROUP BY and ORDER BY strings, into an SQL query. At a step 323, the data access subsystem 140 sends the database request 151 to the database management system 150. The database management system 150 processes the database request 151 with respect to the database 153, and responds with a raw dataset 152**.

The method proceeds with the next flow point.

Translating Raw Dataset

At a flow point 330, the system 100 is ready to translate the raw dataset 152 into the processed dataset 132.

At a step 331, the data access subsystem 140 receives the raw dataset 152 from the DBMS 150.

At a step 332, the data access subsystem 140 accesses the domain dictionary 147 and in response to one or more entries in the domain dictionary 147 and Field Translation structure 143, translates the raw dataset 152, which references database elements, into the processed dataset 132, which references domain concepts **122*b***.

At a step 333, the data access subsystem 140 determines if there are any as-yet-unprocessed snippets **122*a*. If so, the method returns to step 322, where the values of the domain concepts 122*b* of the processed dataset may be employed in creating further database request fragments 145**.

If all snippets **122*a* have been processed, at a step 334, the data access subsystem 140 sends the processed dataset 132 to the presentation subsystem 130**.

The method proceeds with the next flow point.

Presenting Processed Dataset

At a flow point 340, the system 100 is ready to present the processed dataset 132 to the operator 110. At a step 341, the presentation subsystem 130 receives the processed dataset 132 from the data access subsystem 140.

At a step 342, the presentation subsystem 130 accesses the presentation requirements 123 received from the language processing subsystem 128, and constructs a presentation to be coupled to the output interface 102. For example, the presentation can include responsive values, charts, or tables in terms of domain concepts **122*b***.

At a step 343, the presentation subsystem 130 presents the constructed presentation to the operator 110.

End of Method

At a flow point 300B, the method 300 is finished, and is ready to be re-performed under selected conditions. For example, the method 300 can be re-performed under the conditions described with respect to the flow point 300A.

While the method is primarily described with respect to database queries similar to SQL queries and with respect to target databases similar to relational databases, in the context of this embodiment, there is no such requirement for any such limitation. For example, using the method with database queries and target databases not at all similar to SQL queries and relational databases, such as Lisp objects and Lisp code, Excel workbooks and the Excel REST API, or other computing techniques capable of maintaining structured or semi-structured data, would be workable. After reading this Application, techniques for doing so would be clear to those skilled in the art.

Example Presentations of User Interface

Figure 4A:
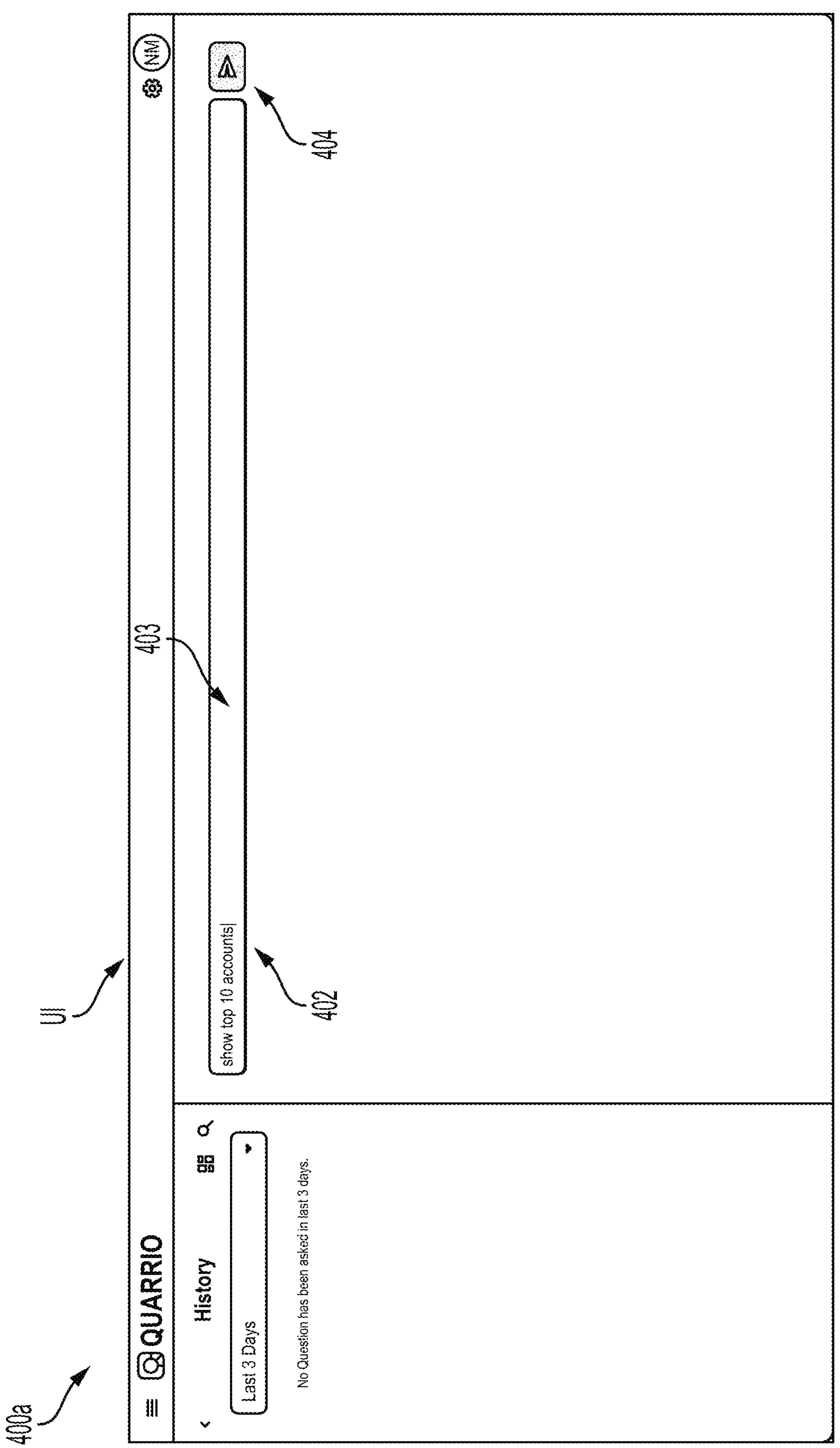
FIGS. 4A-4K illustrate example presentations on an input interface of the system architecture of FIG. 1 during use of the computer system.

FIGS. 4A-4K illustrate example presentations 400*a*-400*k* of an exemplary User Interface ("UI") incorporating an example presentation subsystem 130 during example operations of the computer system 100 of this disclosure. FIG. 4A shows an example UI presentation 400*a* of an interactive landing page of the UI. The interactive landing page acts as the main conversation interface for operators to enter queries, receive answers, and enter follow-up queries. Questions may be provided in the form of a query 402 entered in a field displayed on the interactive landing page.

Figure 4B:
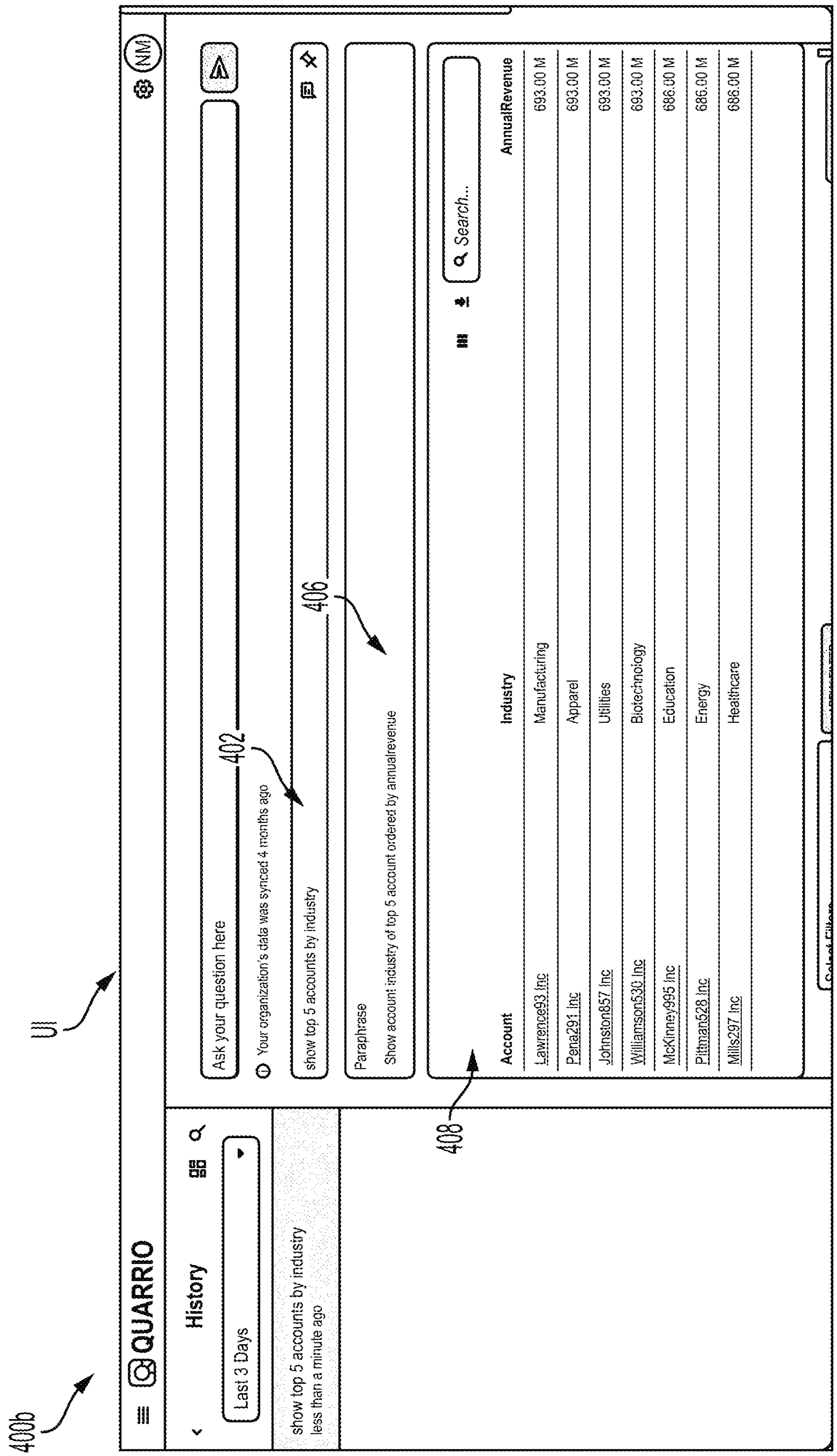

After the query 402 is submitted (e.g., by pressing enter on a keyboard, selecting the submission icon 404, etc.), the UI presentation 400*b* of FIG. 4B is displayed. In this example, a paraphrase 406 of the query 402 is generated and displayed along with results 408 which were developed responsive to the prompt. The SQL which was used to obtain the data from which the results 408 were computed can optionally be displayed. The operator can optionally hide the SQL and/or the paraphrase 406 (see, e.g., settings shown in FIG. 4I).

The paraphrase 406 may be a restatement of the CQL query in response to submission of the query 402. The paraphrase 406 may provide information about the concepts being accessed to arrive at the results 408. For instance, in this example, the prompt of "show top 5 accounts by industry" results in the paraphrase of "show account industry of top 5 account ordered by annual revenue." As such, the paraphrase is indicating that the "top 5" requested in the prompt is determined on the basis of "annual revenue" rather than another concept. The operator may provide follow-up inputs to refine the search for results if the initial interpretation does not match the operator's desired search.

Figure 4C:
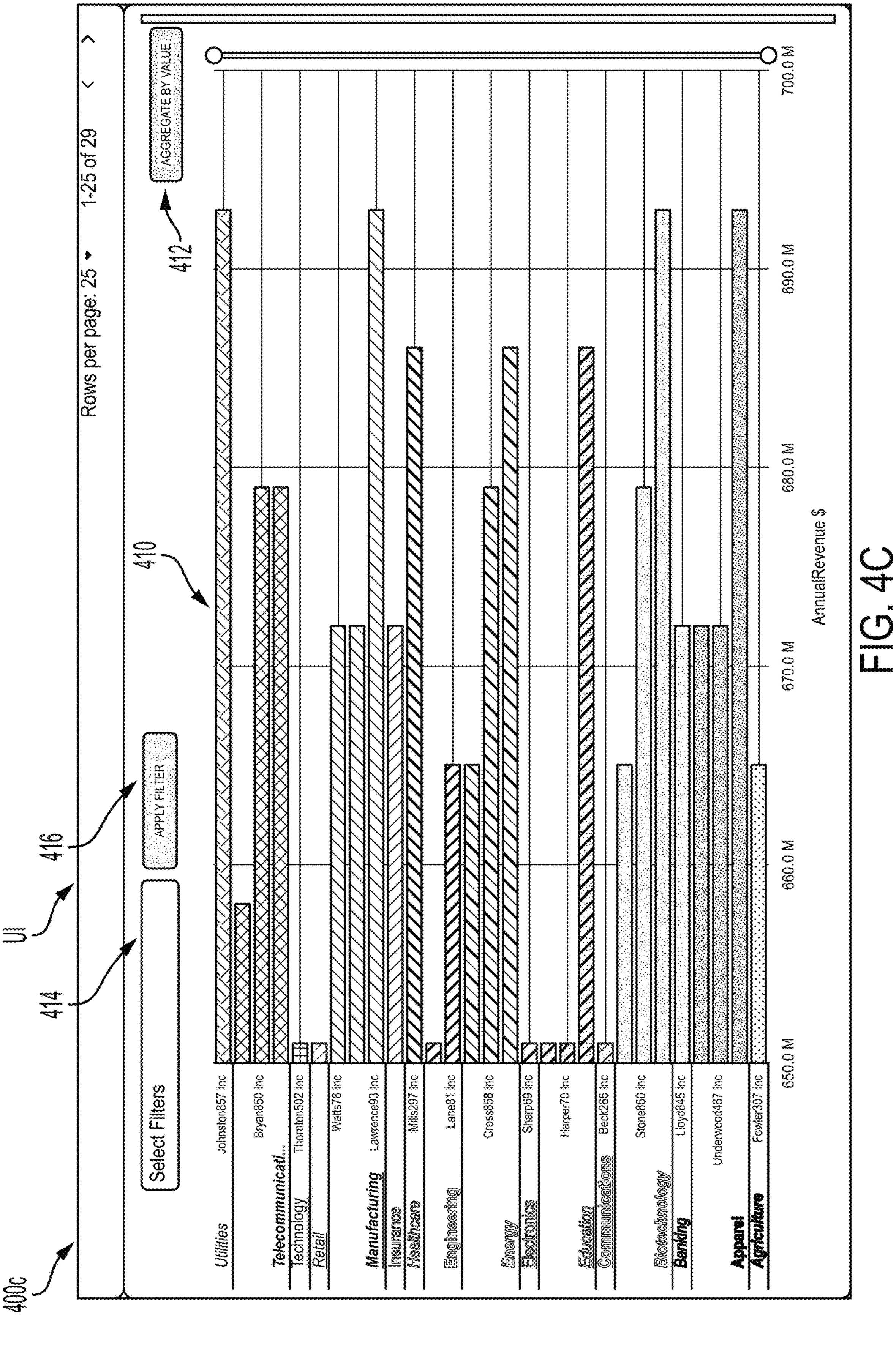
Figure 4D:
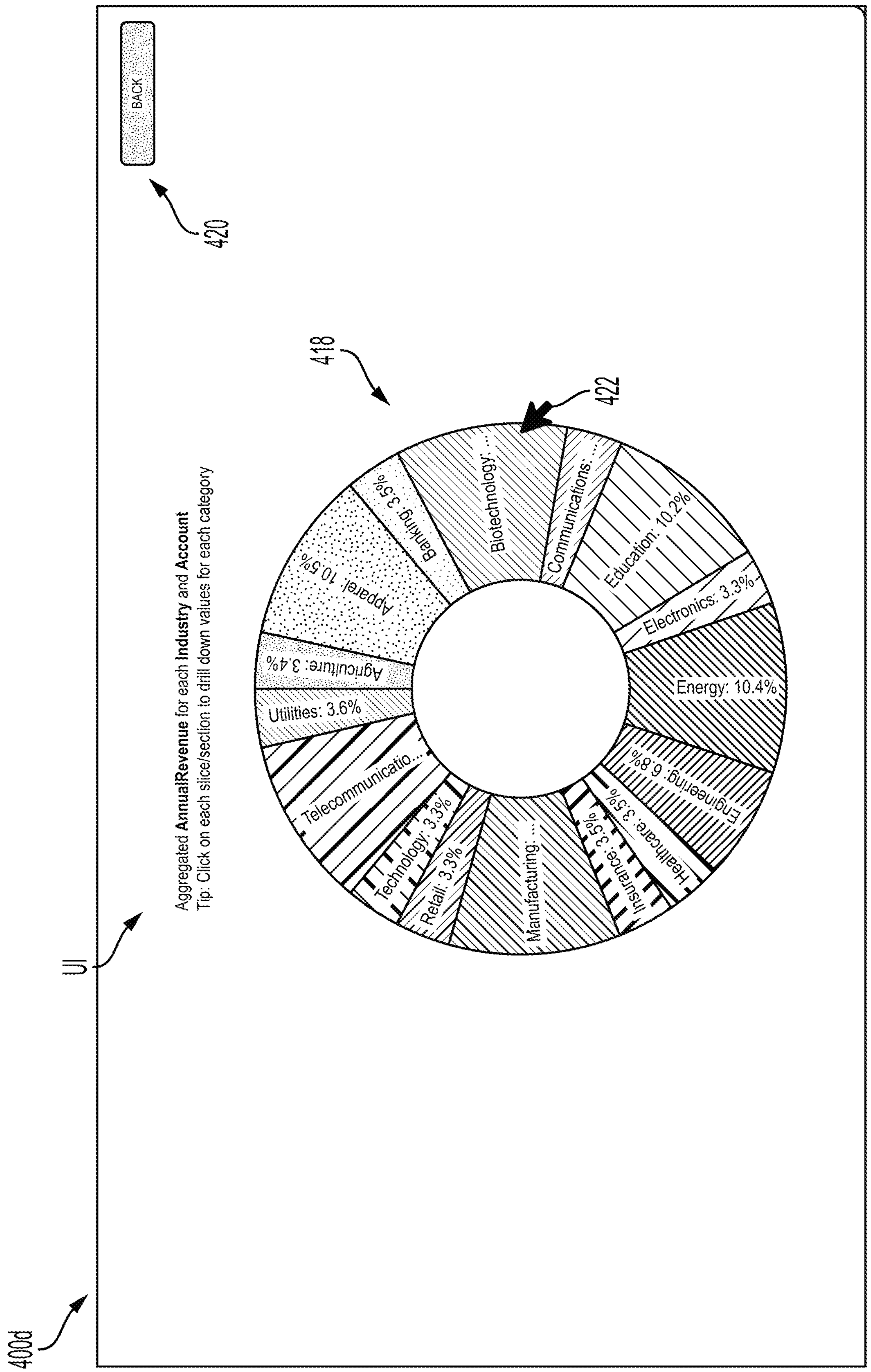

An operator may interact with the UI to view the UI presentation 400*c* of FIG. 4C in which a visualization 410 of results (e.g., results 408 or other results generated by one or more prompts) is presented. The computer system 100 may automatically determine a preferred visualization type for the data being presented. In this example, the visualization 410 is a bar graph showing the aggregated annual revenue for each industry by account. Different visualization types, such as pie charts, line graphs, scatterplots, and the like, may be selected for different data sets based on the natural language query, determinations by the visualization architecture, or both. In some embodiments, the operator can change the visualization type via direct interaction with the UI. The example UI presentation 400*c* also includes a selectable field for filtering the data shown in visualization 410 along with a button 416 for applying the filter. The example UI presentation 400*c* also includes a data aggregation button 412.

When the operator selects the data aggregation button 412, the values of relevant concepts within the processed data set may be summed (for numeric-valued concepts) or totaled (for concepts whose values are non-numeric), and presented in a format determined by applying rules stored in the presentation rule set 131. The results of the operator's selecting the data aggregation button 412 are shown in the UI presentation 400*d* of FIG. 4D. UI presentation 400*d* includes an alternative visualization 418 of the information used to create visualization 410 aggregated by industry (i.e., rather than showing a separate visual representation of information for each entity within each industry). Visualization 418 shows the relative percentage of annual revenue of each industry. Other visualization formats may be used, for example, based on the type, quantity, or other characteristic(s) of the values of concepts in the processed data set and, as discussed previously, on the data types of the corresponding fields of the database. The UI presentation 400*d* includes a "back" button 420 for returning to the UI presentation 400*c* of FIG. 4C.

Figure 4E:
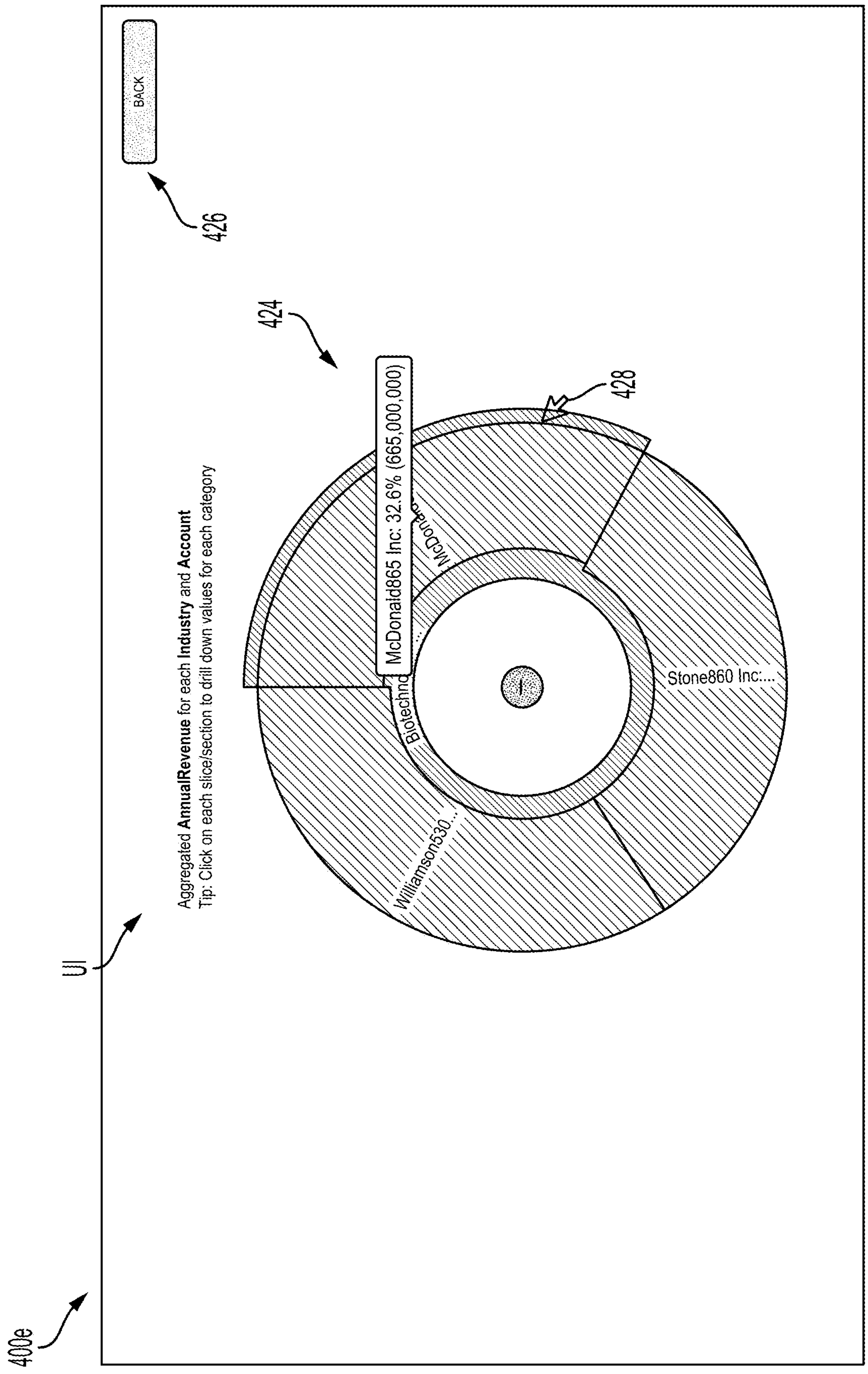

Different regions of the visualization 418 can be selectable, such that further information is accessible to the operator. For instance, if an operator selects the biotechnology industry (e.g., by clicking or tapping on the corresponding region of the visualization 418, as illustrated by the cursor 422), UI presentation 400*e* of FIG. 4E is presented. UI presentation 400*e* includes a visualization 424 of the concept values for the selected industry by account name. Visualization 424 is an example; other visualization formats may be used, for example, based on the type, quantity, and value of the concepts, or other characteristic(s) of the processed data set. The UI presentation 400*e* includes a "back" button 426 for returning to the previous UI presentation, which in this case is presentation 400*c* of FIG. 4C. Additional information may be viewed in visualization 424 by performing an interactive selection action, such as positioning a selection cursor or pointer or performing a touch-based selection (e.g., double tapping or tapping and holding a touchscreen display), as illustrated by the cursor 428. When this action is taken, further information about the selected entity is displayed in the visualization 424. In this example, further details about the entity McDonald865 Inc are shown in response to the interactive selection of this entity.

Figure 4F:
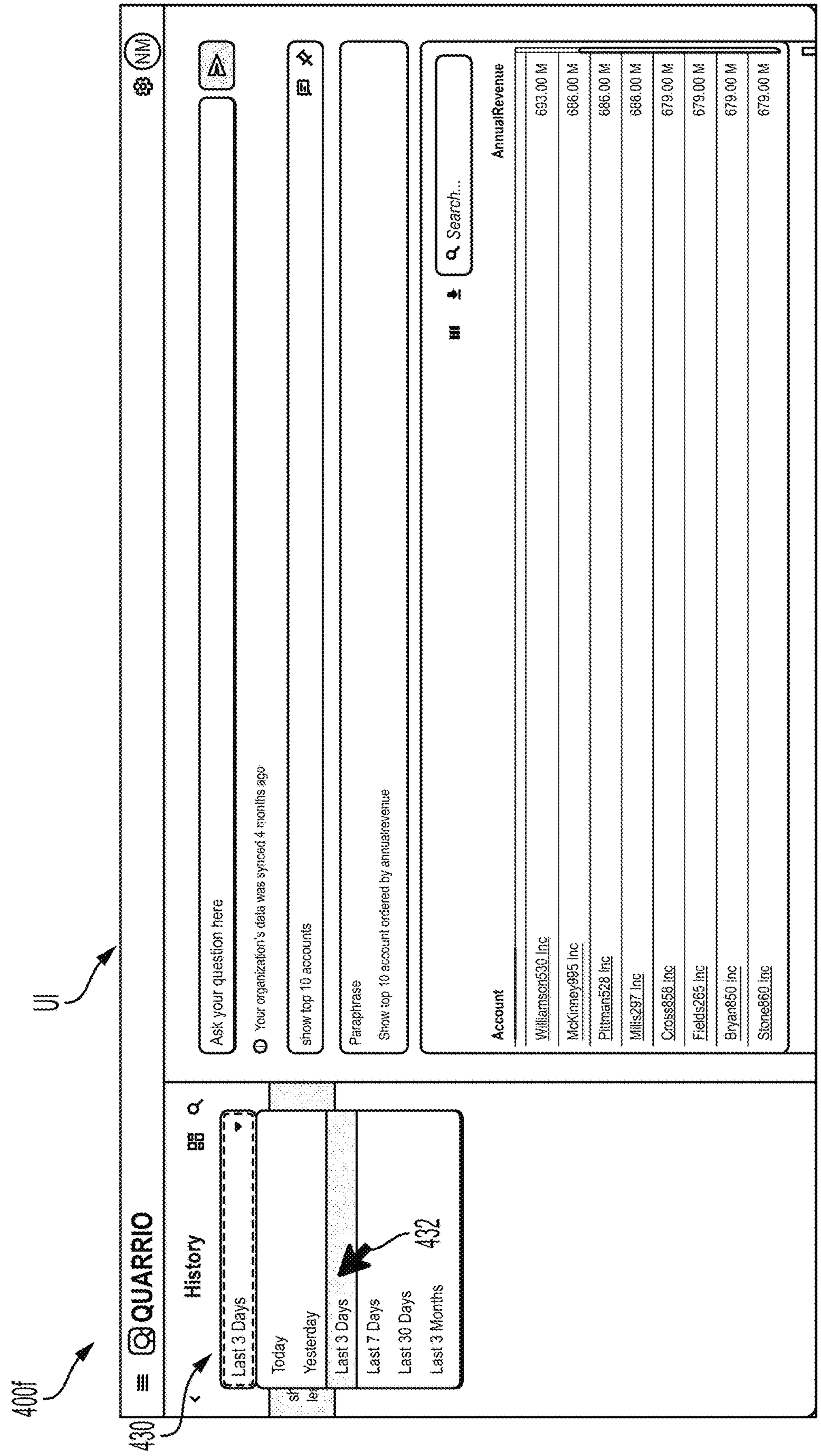

FIG. 4F shows an example UI presentation 400*f* in which an operator was presented with the interactive landing page, has selected a History drop down menu 430, and performed a selection of "Last 3 Days", as illustrated by the cursor 432.

Figure 4G:
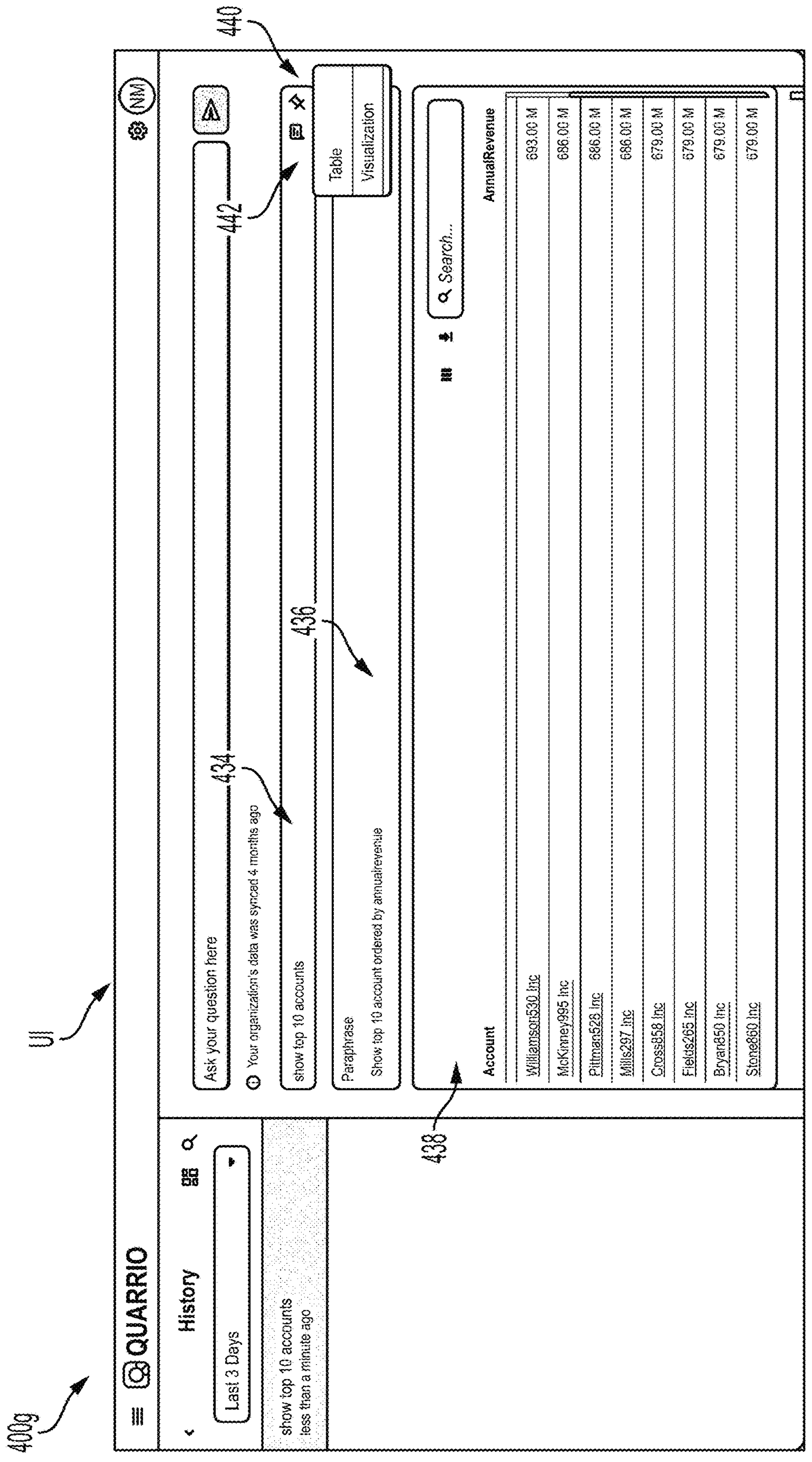

FIG. 4G shows the UI presentation 400*g* responsive to this selection. Prompt 434 selected in the step discussed with respect to FIG. 4F (e.g., the last three days in this case) is displayed along with corresponding paraphrase(s) 436 and results 438. This feature allows an operator to easily access and review previously obtained results. A given prompt 434 may be pinned via selection of button 440. A pinned prompt is saved to be run at one or more future times (see FIG. 4H). A selection tool 442 can be used to toggle between views of the results 438 as a table or as a graphical visualization (see, e.g., FIG. 4C).

Figure 4H:
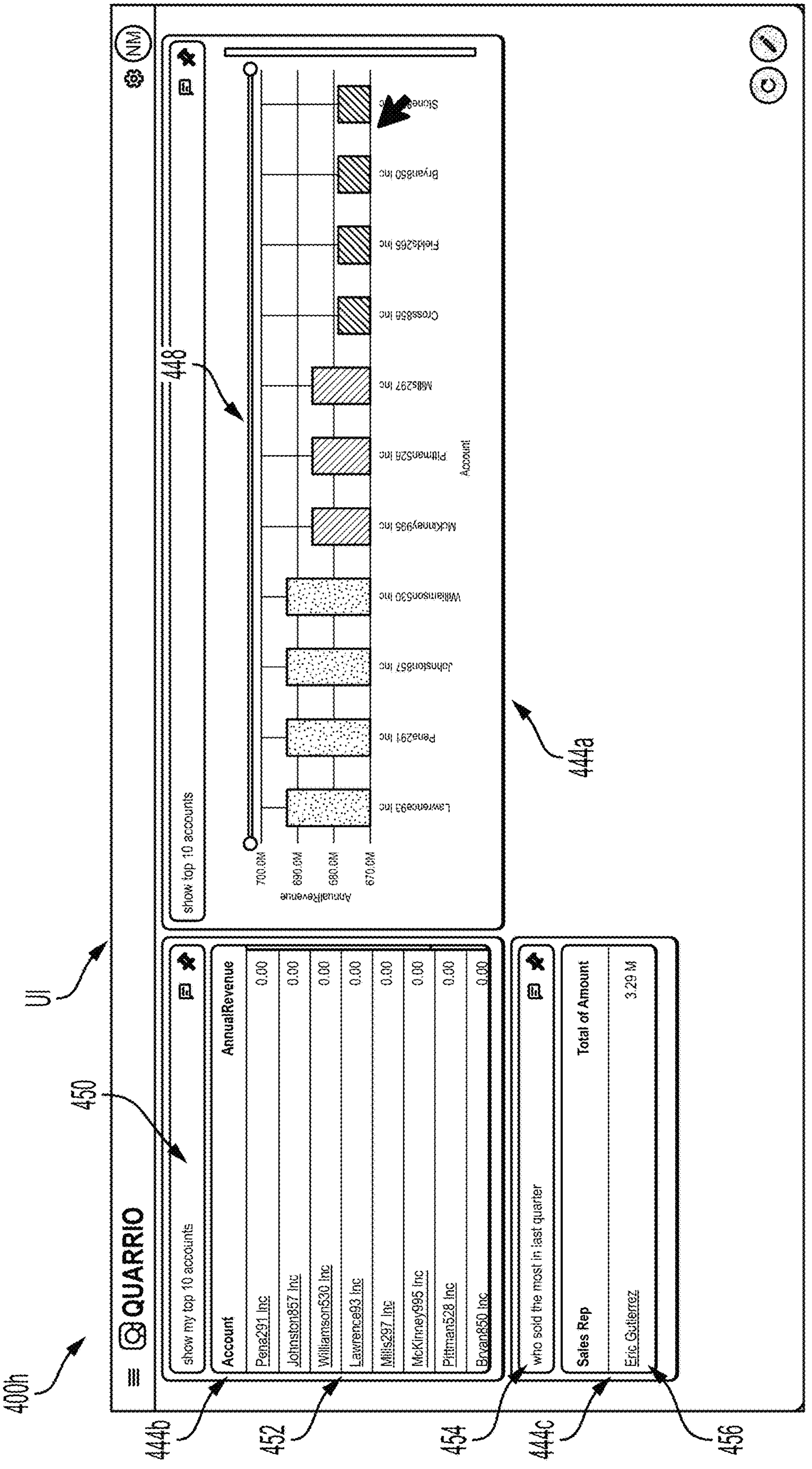

FIG. 4H shows an exemplary UI presentation 400*h* of a dashboard of the UI. The dashboard shows pinned prompts 450, 454 and their corresponding paraphrases and/or visualizations of results 448, 452, 456 in a number of data panels 444*a-c*. Example panel 444*a* shows a pinned prompt 446 along with a visualization 448 of the current results for this prompt 446, respectively. While the visualization 448 is a bar graph in this example, another mode of visually displaying the results may be used, such as a line graph, pie chart, scatter plot, etc., whether automatically selected by the computer system 100 or selected by the operator. Another panel 444*b* shows another pinned prompt 450 and the corresponding results 452 in the form of a table with multiple entries. Panel 444*c* shows another pinned prompt 454 and the corresponding results 456 in the form of a table with a single entry.

Embodiments may automatically configure visualization parameters, including axis labels, color schemes, and legend placement, such that the resulting visualization represents underlying data trends and relationships for presentation to the user interface. For example, FIG. 4H illustrates different shading representing different colors or color schemes that may correspond to, for example, trade dress or branding colors corresponding to respective clients. Alternatively, colors may be chosen to highlight importance, such as blue for less important or red for more important visualizations. Embodiments may also include a legend explaining the meaning of various colors or color schemes. Embodiments may also employ additional and alternative visualization parameters, such as, without limitation a histogram, bubble chart, heatmap, tree map, box plot, Gantt chart, waterfall chart, funnel chart, radar chart, or matrix table.

Figure 4I:
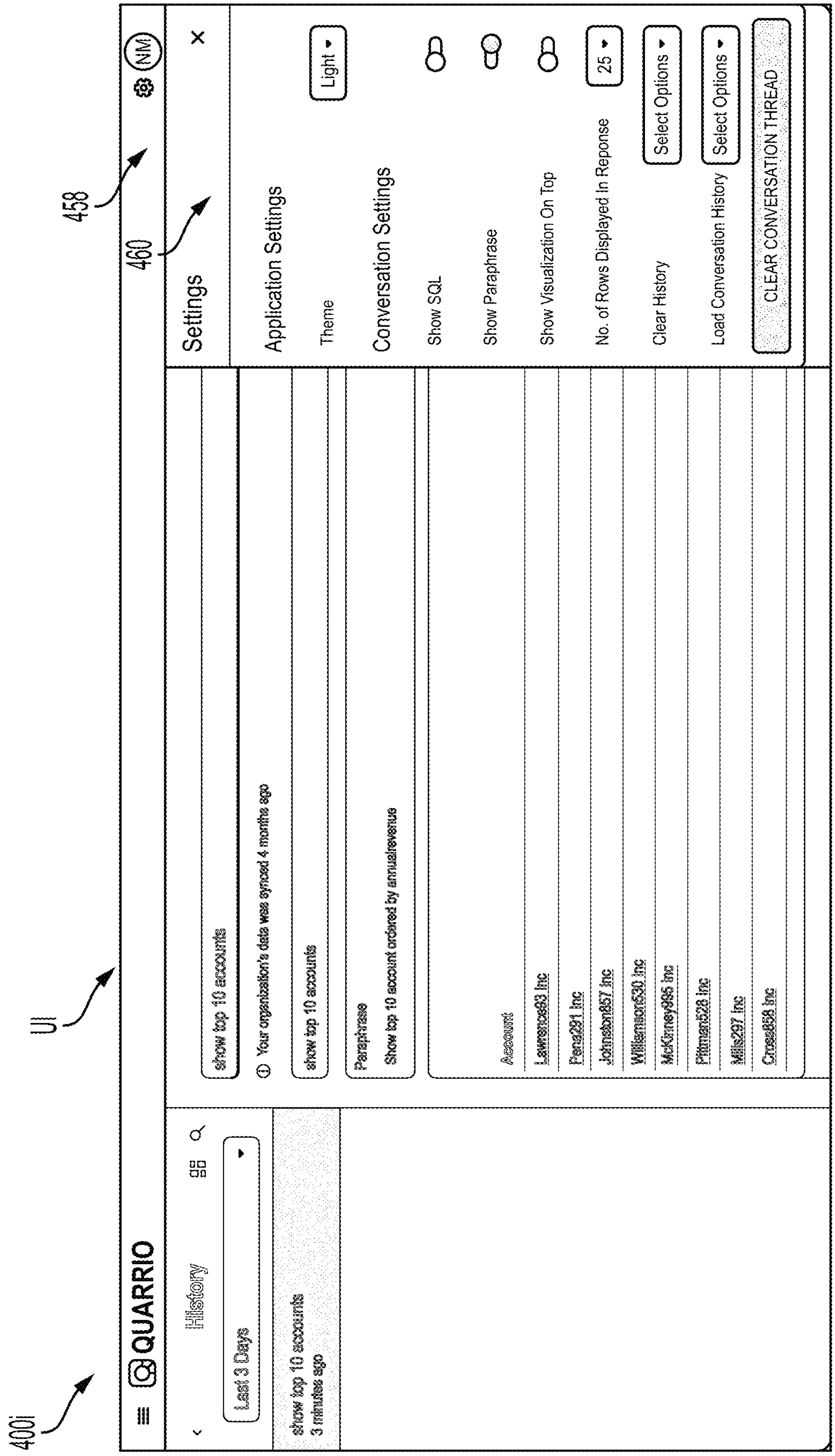

FIG. 4I shows an example UI presentation 400*i* in which an operator has selected a settings button 458 presented on the interactive landing page that causes UI settings 460 to be displayed. The settings 460 may be adjusted as desired to change how the UI is presented (e.g., in a light, dark, or other display mode) and change conversation settings such as showing or hiding various information and adjusting how much information is presented on each page.

Figure 4J:
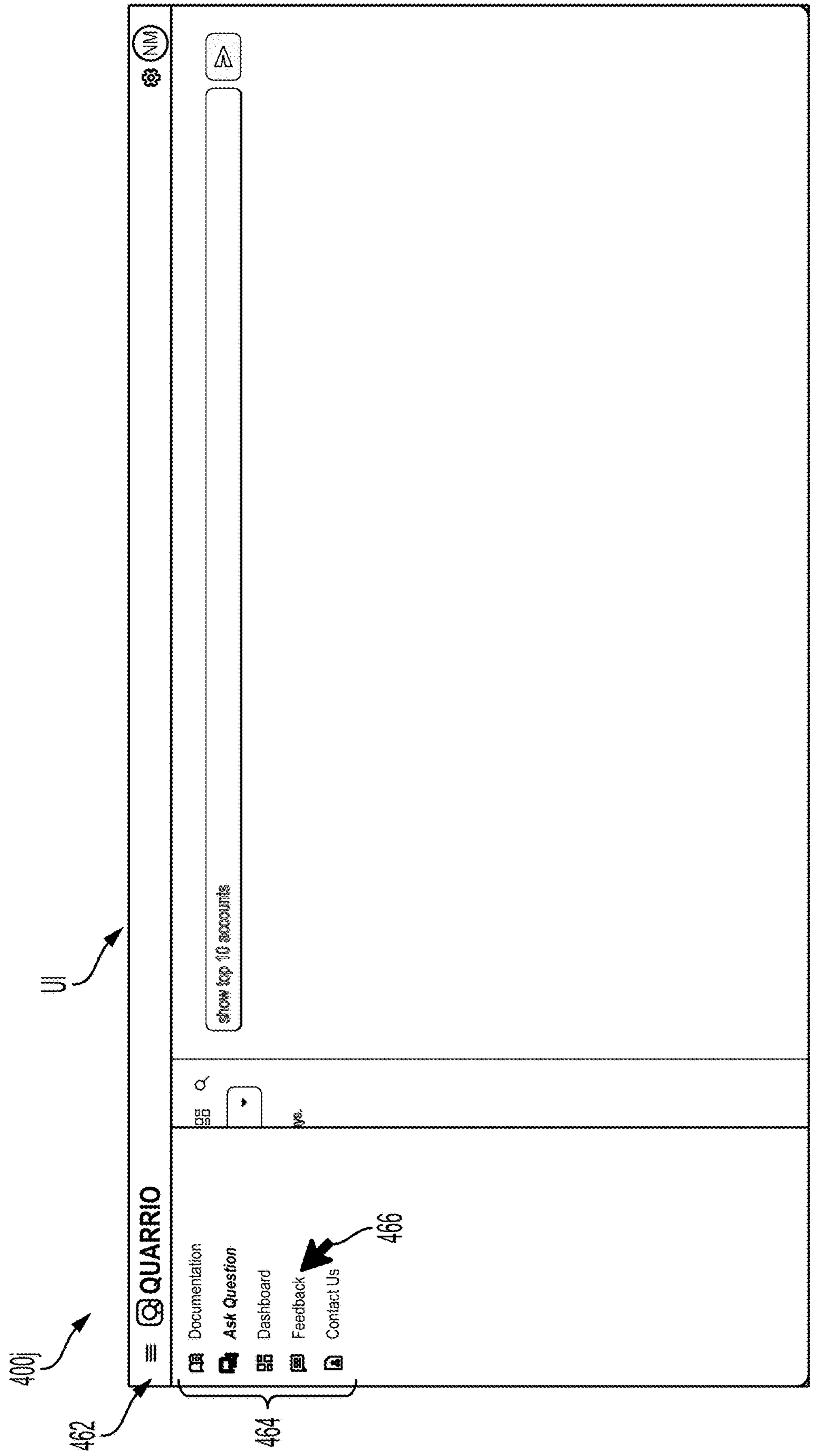
Figure 4K:
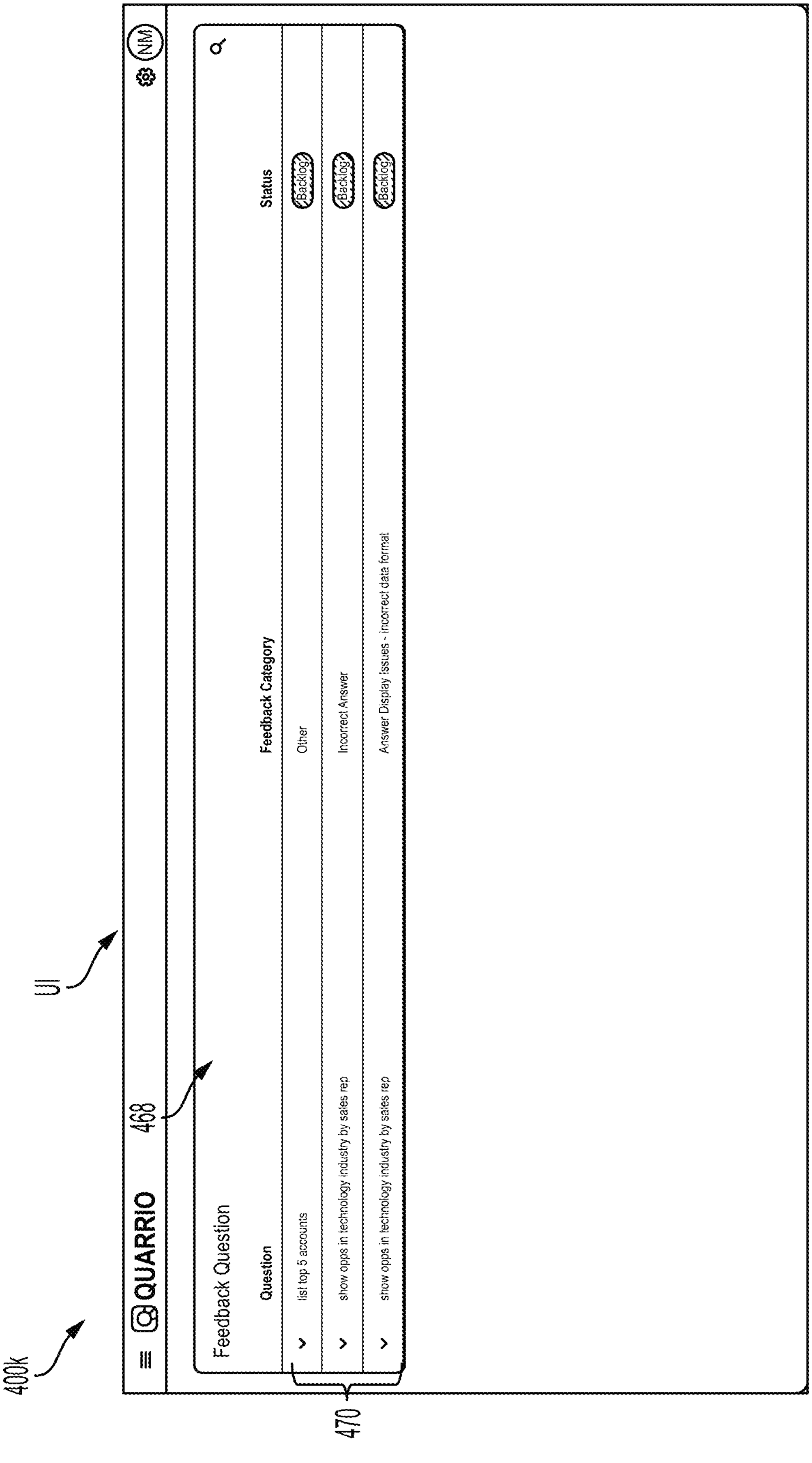

FIG. 4J shows an example UI presentation 400*j* in which an operator has selected a navigation button 462 presented on the interactive landing page that causes the names of available pages 464 to be displayed. An operator selection of a page from the collection of available pages 464 causes the system to present that page to the operator. For instance, if an operator selects the name of the "Feedback" page, as illustrated by the cursor 466 in FIG. 4J, the operator may be presented with the Feedback page shown as UI presentation 400*k* of FIG. 4K. The feedback page allows an operator to submit feedback concerning the system's operation with respect to a specific query. In some cases, feedback may be reviewed by a developer and used to update the computer system 100, related systems, or the information used by computer system 100 (e.g., a grammar file 121 or an entry in a domain dictionary file 149). In addition, the feedback page may show a record of submitted feedback 470 for prior queries.

Alternative Embodiments

Although this Application primarily describes preferred techniques for natural-language database interfaces, in the context of the invention, there is no particular requirement for any limitation to the particular techniques, systems, or methods. Other techniques, systems, and methods would be workable, and could be combined with the techniques described herein.

For example, the described techniques could be combined with one or more techniques for receiving oral speech in a natural language, such as input by one or more operators with a microphone, and transcribing that oral speech into CQL text. In such cases, the CQL text can be used as part of a database interface. The oral speech can be received from one or more human operators, from a speech synthesizer, or otherwise.

For another example, the described techniques could be combined with one or more techniques for receiving graphical descriptions of requests, such as with the operator arranging blocks or symbols on a screen display, and translating those graphical descriptions into a textual or other structured description, expressed in CQL, of the operator request.

For another example, the user interface employed by the operator to specify a natural-language query may be different from the user interface employed to present an operator-viewable presentation of the results of the query. Techniques described herein may readily be adapted to receive the query on one device such as a mobile smartphone, and present the results on another device such as a printer.

For another example, the formal language that is output from the parser can be expressed in a variety of alternative syntaxes. Additionally, information of any nature additional to that described above in exemplary embodiments which is derived from the parsing activity could be expressed in that formal language.

For another example, techniques described herein can be combined with one or more techniques for partially defining domain concepts that might not be implemented in a particular database. In such cases, the natural language component can be disposed to create an appropriate CQL query referencing those domain concepts, even though associated database requests to the particular database could not be generated, due to incomplete domain concept definitions. When the particular database is modified by the addition of new database structure (such as fields, tables, or other database objects), portions of the relevant domain concept definitions can be modified for the system to successfully process CQL queries into database queries associated with those domain concepts. Techniques described herein can adapt to the modification of a particular database without necessarily requiring changes to front-end request processing with respect to the database, such as providing for receiving requests in natural language. In one such case, a natural language processing component could successfully create a CQL query referencing the domain concept "PostalAbbreviation(state)" in response to "WHAT IS THE POSTAL ABBREVIATION OF RICHARD NIXON'S RESIDENCE STATE?", even though no information in a Presidents database referenced postal abbreviations. When a second table associating postal abbreviations with states were added, no change to the natural language component would be required, and by modifying the concept definition for "PostalAbbreviation(state)", the system would be enabled to answer the query appropriately.

For another example, the described techniques could be combined with one or more techniques for initiating and managing a clarification dialog with an operator in an interactive database query system. As described herein, each domain concept definition can include procedures for deriving the value of that domain concept, including from multiple fields in the database. The domain concept definition can also include a procedure or other information indicating how to request the value for a domain concept from the operator 110, or otherwise from the user interface, for any domain concept whose value is required to respond to an input query, but which is not explicitly or implicitly specified in that input query. For example, the domain concept definition for the concept "Average sales revenue per salesperson" can include a clarification question to be presented to the operator for determining the time range over which revenue is to be averaged, such as "Over what period (e.g., year to date, last month, the month of May)?" A sub-grammar specific to such dialog responses can be used to parse the operator's response to such a question. For another example, if the parser successfully processes only a portion of the information request posed by the operator, the interface will show the references to concepts that it did process and show the phrases or words of the request which were not described by the grammar. The parser may ask the operator to restate the query or enter an alternate request that pertains to the concepts that were understood by the parser. The techniques described herein (including the systems and methods) can interface with the parser or another dialog controller to cause the question to be presented to the operator. The parser can parse the operator's response using a sub-grammar described or named in the domain concept definition or elsewhere. In response, the parser can provide one or more snippets in the sub-grammar's logical output format, or alternatively simply provide the requested one or more values. The techniques described herein (including the systems and methods) can process these clauses or values to derive any additional terms needed to complete the CQL query.

For another example, the described techniques could be employed to readily apply an existing front end for querying/commanding a database having a particular schema to an alternative database having an alternative particular schema. Similarly, the described techniques could be employed to readily apply an existing front end for querying/commanding a database managed by a particular DBMS to an alternative database managed by an alternative particular DBMS. Techniques described herein could include providing alternative definitions for the existing concepts in a domain dictionary to map the domain concepts already employed for the existing database(s) or DBMS(s) to the new database or DBMS. In this way, the identical grammar may be employed for each database or DBMS.

For another example, the described techniques could be employed to readily apply an existing front end for querying a database managed by one DBMS to an alternative database managed by an alternative DBMS. Techniques described herein could include providing alternative definitions for the existing concepts in a domain dictionary to map the domain concepts already employed for the existing DBMS and its particular DBMS queries to alternative DBMS queries appropriate to the alternative DBMS.

For another example, the described techniques could be utilized to identify words or collections of words from the operator's query which may describe more than one concept. It may apply information about those concepts that is stored in the domain dictionary to ask contextually relevant clarification questions to the operator, eliciting one or more responses to resolve the ambiguity.

For another example, the described techniques could be utilized to accept queries and access data relevant to a plurality of domains of discourse or operations of an organization. It may do so by combining concepts defined within multiple domain dictionary files. Potential ambiguities may be resolved by employing information about the relationships among the dictionary files and the concepts they represent, being responsive to profiles of the operator or the operator's organizational role, determining a primary domain of discourse from the current or prior queries, or asking questions of the operator.

For another example, the computer system may also include probabilistic and neuro-symbolic capabilities that enhance the deterministic capabilities of the natural language subsystem to handle uncertainties and variations in natural language statements.

For another example, the described techniques could be employed to create a large training set for a machine-learning-based front end to a data retrieval system. As discussed herein, the disclosed system and method can be used to map front-end queries to multiple alternative database structures, provided they reference the same domain. By enabling the front-end to express data queries in a way that is independent of the database schema, all requests to the system, together with each CQL query they generate, can be gathered into a single training set, regardless of the specific database structure to which they were targeted. By enabling the creation of this single training set, the disclosed system and method can support creating a more robust machine-learning-based front end to a data retrieval system than would be the case if the training set were comprised of queries against a collection of different database structures.

The described techniques could be combined with one or more techniques for representing domain knowledge, general knowledge, or a structure developed through an artificial intelligence or machine learning technique (such as supervised or unsupervised machine learning). Information with respect to the domain dictionary, such as particular definitions of domain concepts, particular methods relating to domain concepts, or otherwise, need not be stored in a separate data structure. For example, it can be distributed with respect to a representation relating to an artificial intelligence or machine learning technique. For example, particular nodes, or collections thereof, with respect to an ontology of domain concepts (whether particular to a specific knowledge domain or a more general ontology) can be augmented using methods disclosed with respect to the exemplary tabular domain dictionary discussed above, with the particular nodes being treated similar to domain concepts. For another example, output values from an artificial intelligence or machine learning technique, such as from a neural network, can be augmented using methods disclosed with respect to the domain dictionary, with the particular nodes being treated similar to domain concepts.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, e.g., one or more modules of computer program instructions encoded on a tangible non-transitory storage medium containing instructions for execution by, or to control the operation of, data processing apparatus. The computer storage medium can be a machine-readable storage device, a machine-readable storage substrate, a random or serial access memory device, or a combination of one or more of them. Alternatively, or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them. The data processing apparatus or computer system may be distributed.

Aspects of the systems and methods provided herein can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such as memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or "non-transitory computer-readable medium" refer to any medium that participates in providing instructions to a processor for execution. The non-transitory media may also comprise instructions located in different physical locations in a distributed computer system. For example, some instructions may be located on a server and other instructions may be located on one or more mobile devices for a mobile application. The mobile application and server instructions may be developed by a single entity for distribution to the mobile applications, such that a single developer produces the instructions for both the server and the mobile application.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

After reading this Application, those skilled in the art would recognize that techniques described herein have other and further uses for than the uses described herein. For example, techniques described herein can be used for translation between methods of accessing a first database and methods of accessing a second database.

Moreover, after reading this Application, those skilled in the art would recognize that other and further techniques (including systems and methods), besides those described herein, can be used for the purposes described herein. For example, other and further techniques can be used to translate natural language requests (or other requests not recognized by the DBMS) into methods of accessing a database.

After reading this Application, those skilled in the art would recognize that one or more of the mappings described herein between aspects of domain concepts and aspects of database structures in the domain dictionary are optional. Moreover, after reading this Application, those skilled in the art would recognize that the domain dictionary can optionally include other and further mappings between domain concepts and data, structures, and techniques associated with the database.

We claim:

1. A method of responding to a natural-language query regarding information derived from one or more databases comprising:

- determining, by a session initiation subsystem on a computer system prior to receiving a natural-language query from a particular operator, one or more domains related to a particular sphere of business, activity, or knowledge, and associated with one or more particular operators, including at least the particular operator;
- loading, into a memory by a grammar loader on the computer system, one or more grammar files corresponding to a domain-specific grammar corresponding to the determined one or more domains;
- transforming, by the grammar loader on the computer system, the grammar files into a specification of a grammar;
- loading, by a domain dictionary loader into a memory of the computer system, one or more domain dictionary files corresponding to a domain-specific domain dictionary corresponding to the determined one or more domains;
- transforming, by the domain dictionary loader on the computer system, the domain dictionary files into a specification of a domain dictionary;
- receiving, by a parser on the computer system, the specification of the grammar;
- receiving, by a language processing subsystem on the computer system, the natural-language query from a user interface after the transforming the grammar files into the specification of the grammar;

parsing, by the parser of the computer system using the specification of the grammar, the natural-language query;

identifying, by the language processing subsystem of the computer system using the domain-specific grammar, references to one or more domain concepts or sub-concepts within said natural-language query;

determining, by the language processing subsystem of the computer system, one or more relationships among the identified references to the one or more domain concepts or sub-concepts;

transforming, by the computer system, the one or more domain concepts or sub-concepts to one or more specific database fields or portions thereof using the domain dictionary;

generating, by the language processing subsystem of the computer system, a Concept Query Language ("CQL") query comprising the one or more domain concepts, said query representing the natural-language query;

generating, by a data access subsystem of the computer system, one or more database queries from the CQL query;

executing, by the data access subsystem of the computer system, the one or more database queries against one or more data sources to retrieve data;

generating, by the data access subsystem of the computer system, a processed dataset based on the retrieved data;

generating, by the computer system, one or more operator-viewable presentations based on the processed dataset; and presenting, by the computer system, the one or more operator-viewable presentations to the user interface.

2. The method of claim 1 comprising:

generating one or more additional database queries based on the retrieved data.

3. The method of claim 2, wherein the one or more database queries are directed to multiple databases.

4. The method of claim 3, wherein the multiple databases are processed by a plurality of DBMSs.

5. The method of claim 1 further wherein the one or more domains comprises more than one domain.

6. The method of claim 1 further wherein the one or more identified domain concepts refer to one or more other domain concepts as parameters.

7. The method of claim 1 further comprising:

generating, by the computer system, one or more clarification questions;

presenting, by the computer system, the one or more clarification questions to the user interface; and receiving, by the computer system, one or more responses to the one or more clarification questions.

8. The method of claim 1 further comprising:

receiving, by the language processing subsystem on the computer system, a second natural-language query from the user interface;

identifying, by the parser on the computer system, one or more ellipses corresponding to one or more missing words in the second natural-language query;

replacing, by the parser on the computer system, the one or more ellipses based on context established by one or more previous natural-language queries.

9. The method of claim 1 further comprising:

generating, by the language processing subsystem of the computer system, a paraphrase of the natural-language query; and displaying, by the computer system, the paraphrase to the user interface.

10. The method of claim 9, wherein the paraphrase is responsive to the CQL query in response to submission of the natural-language query.

11. A method comprising:

determining, by a computer system prior to receiving a natural-language query from a particular operator, a domain related to a particular sphere of business, activity, or knowledge, and associated with one or more particular operators, including at least the particular operator;

generating, by the computer system, a specification of a domain-specific grammar from one or more grammar files or sub-grammar files;

generating, by the computer system, a specification of a domain dictionary from one or more domain dictionary files;

receiving, by a language processing subsystem on the computer system, a natural-language query from a user interface;

parsing, by a parser of the computer system using the specification of the domain-specific grammar, the natural-language query;

identifying, by the language processing subsystem using the domain-specific grammar, one or more domain concepts and sub-concepts related to the natural-language query;

determining, by the language processing subsystem, one or more relationships between the domain concepts and sub-concepts;

generating, by the language processing subsystem, a structure-independent query representing a meaning of the natural-language query;

transforming, with the computer system, the identified domain concepts into one or more specific database fields or portions thereof using the specification of the domain dictionary;

generating, with the computer system, a sequence of one or more database queries referencing the one or more specific database fields;

querying, with the computer system using the one or more database queries, a database management system;

receiving, by the computer system, a raw dataset in response to querying the database;

generating, with the computer system, a processed dataset based on the dataset returned by the database management system responsive to the one or more database queries; and presenting, with the computer system, a presentation based on the processed dataset to the user interface.

12. The method of claim 11 further comprising:

extracting schema information responsive to the domain dictionary; and generating a field translation structure, wherein the field translation structure maps domain concepts to respective database schema metadata.

13. The method of claim 11, wherein the one or more database queries comprise multiple database queries.

14. The method of claim 13, wherein the one or more database queries are directed to a plurality of databases.

15. The method of claim 11 further comprising: determining, by the computer system, a preferred visualization type for the processed dataset.

16. The method of claim 15, wherein determining the preferred visualization type further comprises:

analyzing characteristics of the processed dataset, including data distribution, cardinality, and relationships between concepts;

selecting, by the computer system, at least one visualization type from a group comprising pie chart, line graph, bar graph, or scatterplot based on the analyzing; and automatically configuring visualization parameters, including axis labels, color schemes, and legend placement, such that the resulting visualization represents underlying data trends and relationships for presentation to the user interface.

17. The method of claim 11 further comprising:

receiving, by the computer system, one or more clarification questions;

generating, by the computer system, instructions for displaying the one or more clarification questions; and receiving, by the computer system, one or more responses to the one or more clarification questions.

18. The method of claim 11 further comprising:

receiving, by the computer system, a second natural-language query from the user interface;

identifying, by the computer system, one or more ellipses corresponding to one or more missing words in the second natural-language query;

replacing, by the computer system, the one or more ellipses based on context established by one or more previous natural-language queries.

19. The method of claim 11 further comprising:

generating, by the computer system, a paraphrase of the natural-language query; and displaying, by the computer system, the paraphrase to the user interface.

20. A tangible non-transitory storage medium containing instructions for execution by, or to control operation of, data processing apparatus, the instructions comprising steps comprising:

determining, prior to receiving a natural-language query from a particular operator, a domain related to a particular sphere of business, activity, or knowledge, and associated with one or more particular operators, including at least the particular operator, to be processed by the data processing apparatus;

generating a specification of a grammar from one or more grammar files or sub-grammar files;

generating a specification of a domain dictionary from one or more domain dictionary files;

receiving a natural-language query from a user interface;

parsing, using the specification of the grammar, the natural-language query;

identifying one or more domain concepts and sub-concepts related to the natural-language query;

determining one or more relationships between the domain concepts and sub-concepts;

generating a structure-independent query representing a meaning of the natural-language query;

mapping the identified domain concepts to all or portions of one or more specific database fields using the specification of the domain dictionary;

generating a sequence of one or more database queries using the one or more mapped specific database fields;

querying, the one or more database queries, a database management system;

receiving a raw dataset in response to querying the database;

generating a processed dataset based on the data received responsive to the one or more database queries; and presenting the processed dataset to the user interface.

21. The tangible non-transitory storage medium of claim 20, wherein the one or more database queries comprise multiple database queries.

22. The tangible non-transitory storage medium of claim 21, wherein the multiple database queries are directed to multiple databases.

23. The tangible non-transitory storage medium of claim 22 further comprising steps for:

generating one or more clarification questions;

generating instructions for displaying the one or more clarification questions; and receiving one or more responses to the one or more clarification questions.

24. The tangible non-transitory storage medium of claim 22 further comprising steps for:

receiving a second natural-language query from the user interface;

identifying one or more ellipses corresponding to one or more missing words in the second natural-language query;

replacing the one or more ellipses based on context established by one or more previous natural-language queries.

25. The tangible non-transitory storage medium of claim 20 further comprising steps for:

generating a paraphrase of the natural-language query; and displaying the paraphrase to the user interface.

26. The tangible non-transitory storage medium of claim 20 further comprising steps for: determining a preferred visualization type for the processed dataset.

* * * * *